United States Patent [19]
Maeno et al.

[11] Patent Number: 5,602,547
[45] Date of Patent: Feb. 11, 1997

[54] DATA CONVERSION APPARATUS AND ENCODING APPARATUS

[75] Inventors: Kenji Maeno; Kihei Ido; Hideaki Kosaka, all of Nagaokakyo, Japan

[73] Assignee: Mitsubishi Denki Kabushiki Kaisha, Tokyo, Japan

[21] Appl. No.: 328,919

[22] Filed: Oct. 25, 1994

[30] Foreign Application Priority Data

| Oct. 27, 1993 | [JP] | Japan | 5-268830 |
| Mar. 22, 1994 | [JP] | Japan | 6-050537 |
| Jul. 11, 1994 | [JP] | Japan | 6-159010 |

[51] Int. Cl.$^6$ .................................. G11B 5/09
[52] U.S. Cl. .................................. 341/58; 360/40
[58] Field of Search .................. 341/95, 58, 59; 360/40, 32, 18

[56] References Cited

U.S. PATENT DOCUMENTS

| 5,196,848 | 3/1993 | Sakazaki | 341/58 |
| 5,365,232 | 11/1994 | Ido et al. | |
| 5,432,651 | 7/1995 | Maeno | 360/41 |

FOREIGN PATENT DOCUMENTS

| 1317280 | 12/1989 | Japan. |
| 4255969 | 9/1992 | Japan. |

*Primary Examiner*—Brian K. Young
*Assistant Examiner*—Peguy JeanPierre

[57] ABSTRACT

A data conversion apparatus which converts an m-bit data into plural n-bit codes having different CDS values to obtain an intense spectrum at frequencies with a period of p bits has a CDS control signal generator which generates data of a known CDS in codeword with one period which is the least common multiple (q) of n and p, an error detector which detects differences between values of charge in codeword at intervals of (r) bits (where r is the greatest common divisor of n and p) and the data of the known CDS in codeword and detects a sum of absolute values ($\Delta$CDS) of the differences, and a minimum value hold circuit which selects a code having the smallest sum of absolute values ($\Delta$CDS), from the plural n-bit codes having different CDS values.

53 Claims, 23 Drawing Sheets

FIG. 2
PRIOR ART

| 1 | C1 CDS | C2 CDS | C3 CDS |
|---|---|---|---|
| i=1   0 | | | +2 |
| 19 | | | |
| 20 | +2 | −2 | |
| 179 | | | 0 |
| 180 | | | |
| 192 | | −4 | |
| 193 | 4 | | |
| i=256   255 | | | |

FIG. 11

| INPUT DATA | ① 297D50 | ② B79CAC | ③ C1B5D1 | ④ 910240 |
|---|---|---|---|---|

KNOWN CDS

SIGNAL 4321, Y    1  1  1  1  1  -1  -1  -1  -1  1  1  1  1  -1  -1  -1

| | | | |
|---|---|---|---|
| 0000, 0 | 0001000010010001010<br>-3  -1  -3  1 | 0001100111001011101010<br>1  -1  1  3 | 1101010110110110101010<br>1  3  -3  1 | 0000101000000010111100001<br>-3  -3  1  3  -5  3  -1 → I-NRZI CODE<br>→ CHARGE IN CODEWORD |
| 0000, 1 | 0100010110011011101111<br>-3  1  -1  3 | 10110100101000010001111<br>1  1  1  -3 | 10000000111000100110111011<br>-3  -1  -1  3 | 1010000101010111010100<br>-1  -3  1  -3 → I-NRZI CODE<br>→ CHARGE IN CODEWORD |
| 0001, 0 | 10111010001100100010000000<br>3  -1  -3  -5 | 01001001011001111011000<br>1  1  -3  3 | 0111110001110100000100<br>3  -1  1  -1 | 0101110101010000101011<br>-1  -1  3  3 → I-NRZI CODE<br>→ CHARGE IN CODEWORD |
| 0001, 1 | 11101110100111011110100<br>3  1  3  1 | 1110001100011101010<br>1  -1  -1  -1 | 00101010010010001101110<br>-1  -1  -3  1 | 1111011111110100001110<br>3  -3  5  -3  1 → I-NRZI CODE<br>→ CHARGE IN CODEWORD |
| 0101, 1 | | | | |
| 1111, 1 | 11101110100111011101010<br>3  3  1  3 | 0100100101001011110000<br>1  -1  -1  -1 | 110101011011011100110100<br>1  1  -3  3 | 1010000101010111010100<br>-1  -3  1  -3 → I-NRZI CODE<br>→ CHARGE IN CODEWORD |

DATA CONVERSION APPARATUS AND ENCODING APPARATUS

BACKGROUND OF THE INVENTION

1. Field of the Invention

The invention relates to a data conversion apparatus and an encoding apparatus which are useful in a magnetic recording/reproduction apparatus such as a digital VTR for recording and reproducing a digital signal, and particularly to a data conversion apparatus and an encoding apparatus which are suitable for a high density recording.

2. Description of Related Art

FIG. 1 shows a diagram illustrating an ATF (Automatic Track Finding) servo of the 2-frequency pilot system. In FIG. 1, the reference numeral 70 denotes a magnetic tape. Formed in the magnetic tape 70, are A track 71, which has plus azimuth and on which a pilot signal f1 is recorded, B track 72, which has minus azimuth, and A track 73, which has plus azimuth and on which a pilot signal f2 is recorded. Numeral 74 denotes B head which has minus azimuth.

Prior art data conversion techniques include the 8–10 conversion which is shown in, for example, Japanese Patent Application Laid-Open No. 1-317280(1989). The 8–10 conversion is a method in which, prior to recording digital data into information tracks of a recording medium, continuous data words (applied data words) of an applied digital signal are converted into channel words in the form of selected channel codes. The channel codes have different CDSs.

FIG. 2 diagrammatically shows an example of a table having three channel word strings (C1, C2, C3). One string is assigned with 256 (=$2^8$) data words which represent numerals from 0 to 255 in decimal notation. For each data word I(i), each string includes a channel word Cj(i) where j =1, 2 or 3. These data words have different CDSs. Therefore, three channel words can be utilized for one data word I(i).

The 8–10 conversion includes a second signal which relates to a recorded information signal and has a carrier wave of a relatively low frequency. This signal is a pilot signal which serves as a tracking signal giving information on the relative position of a read-out element with respect to an information track, namely the track crossing position.

Systems of controlling tracking using a pilot signal include the ATF servo shown in FIG. 1. The B head 74 is slightly wider than the B track 72, and reproduces a signal on the B track 72 and cross-talk signals from the A tracks 71 and 73 on both sides. When tracking is correctly performed, the cross-talk signals have the same reproduction level. By using this fact, the ATF servo performs a tracking control in which the reproduced signal is passed through a BPF of a pass bandwidth frequency of f1 and a BPF of a pass bandwidth frequency of f2 to extract pilot signals of f1 and f2, the extracted pilot signals are integrated, and the tracking is adjusted so that the reproduction levels through f1 and f2 become the same.

According to the 8–10 conversion, in order to insert the pilot signals of f1 and f2 into the data stream of channel words, a control signal corresponding to the second signal is generated, and channel words are selected from the table of FIG. 2 so that the mean value of the recorded digital signals changes in a manner approximately coincident with the change of the second signal of a relatively low frequency.

At present, a digital VTR which can record images for a long time with high image quality and which uses a miniature cassette is under development. For such a digital VTR, a high density magnetic recording/reproduction technique is indispensable. An example of a high density magnetic recording/reproduction technique is a narrow-track technique. Hereinafter, this technique will be described.

When a pilot signal is added to a record signal, there appears an influence that the error rate is impaired in a reproduction process. To comply with this, in a digital VTR or the like, a pilot signal is generated using a digital pilot tone. When such a pilot signal is added to a record signal, the error rate is not impaired.

As a record signal, the following record signals of three kinds, for example, are used. A first record signal is a code data F1 having a pilot signal of a frequency f1 and a notch at a frequency f2, a second record signal is a code data F2 having a pilot signal at a frequency f2 and a notch at a frequency f1, and a third record signal is a code data F0 having a notch at frequencies f1 and f2. These signals are recorded on a magnetic tape while switching them for each track.

In the track pattern, F0 is recorded on a first track, F1 on a second track, F0 on a third track, and F2 on a fourth track, and this sequence is repeated on the subsequent tracks. A tracking servo is realized by conducting a control in such a manner that, during the reproduction of, for example, F0 on the third track, the cross-talk levels of the pilot signals of f1 and f2 from the second and fourth tracks on both sides are equal to each other. According to this control, the tracking servo can correctly be conducted.

When a pilot signal is to be detected during a reproduction process, a band-pass filter (BPF) is used. Since tracks on both sides of a track containing a pilot signal have a notch at the pilot frequency, the S/N ratio of the pilot signal is increased, and that, even when the BPF has a small Q, the tracking properties are hardly affected.

FIG. 3 shows the configuration of an encoding apparatus. Numeral 49 denotes a parallel/serial converter which converts an input record data into a serial data. The parallel/serial converter 49 outputs the converted serial data to a 0 addition circuit 50, and a 1 addition circuit 51. The 0 addition circuit 50 adds 1 bit of "0" to the MSB of the record data and then outputs the data to a precoder 52. The 1 addition circuit 51 adds 1 bit of "1" to the MSB of the record data and then outputs the data to a precoder 53. The precoders 52 and 53 precode the input data and output the data to frequency component extractors 54 and 55, run-length detectors 56 and 57, and delay circuits 59 and 60. The frequency component extractors 54 and 55 extract the frequency components of the pilot frequency and the notch frequency, and output the extracted frequency components to an output determiner 58. The run-length detectors 56 and 57 detect the run length of the input data and output it to the output determiner 58. The output determiner 58 outputs a change-over signal to a switch 61 on the basis of the outputs of the frequency component extractors 54 and 55 and the run-length detectors 56 and 57. In response to the change-over signal, the switch 61 selects either of the outputs of the delay circuits 59 or 60, and output it as a code data.

Next, the operation of the encoding apparatus will be described. The parallel/serial converter 49 accumulates 24 bits of 8-bit record data, converts them into serial data, and outputs the converted data. When the bit frequency of a record data is indicated by fb, the read-out frequency fb' is obtained by an expression of fb'=(25/24)×fb. The 1-bit addition is conducted by adding "0" or "1" (hereinafter, such a bit is referred to as "control bit") to the MSB of the record data by means of the 0 addition circuit 50 or the 1 addition circuit 51. The data to which a control bit is added is precoded by the precoders 52 and 53. The precoders 52 and 53 are of the I-NRZI type, and an EXOR of the input data and a 2-bit delayed data outputted from one of the precoders 52 or 53 is an output of the respective precoder 52 or 53.

The frequency component extractors 54 and 55 extract the frequency components of the pilot frequency and the notch frequency. When the code data to be generated is F1, for example, the pilot frequency is f1 and the notch frequency is f2. When the code data is F0, both f1 and f2 are notch frequencies and there is no pilot frequency. The run-length detectors 56 and 57 detect the run length of the input data. The delay circuits 59 and 60 delay the outputs only when the frequency component extractors 54 and 55 and the run-length detectors 56 and 57 operate.

The output determiner 58 controls the switch 61 so as to output a signal in which the pilot frequency component is larger and the notch frequency component is smaller, on the basis of the frequency components extracted by the frequency component extractors 54 and 55. When the run length is 10 or more, for example, the switch 61 is controlled so as to unconditionally output a signal in which the run length is shorter. When the state of the switch 61 is changed by the output determiner 58, the delay circuits 59 and 60 output data, and one of the data is outputted from the encoding apparatus as code data.

FIG. 4 shows the configuration of the prior art frequency component extractor 54 shown in FIG. 3. The configuration and operation of the frequency component extractor 55 are the same as those of the frequency component extractor 54, and hence the following description is conducted only on the frequency component extractor 54. The frequency component extractor 54 has adders 21, 30, 35, 40 and 45, holding circuits 22, 31, 36, 41 and 46, subtracters 23 and 26, a known DSV generator 24, squarers 25, 32, 37, 42 and 47, a known data generator 27, multipliers 28, 33, 38 and 43, a weighting adder 48, sine wave generators 62 and 64, and cosine wave generators 63 and 65.

The data from the precoder 52 is inputted to the adder 21 and the subtracter 26. The adder 21 adds the input value and a value held in the holding circuit 22, and the sum is held in the holding circuit, 22. The subtracter 23 obtains the difference between the DSV of an input signal which is an output from the holding circuit 22 and the known DSV generated by the known DSV generator 24, and the difference is output to the squarer 25. The squarer 25 squares the difference and outputs it to the weighting adder 48.

On the other hand, the subtracter 26 obtains the difference between the input data and a known data generated by the known data generator 27, and outputs the difference to the multipliers 28, 33, 38 and 43. The multiplier 28 multiplies a sine wave of the frequency f1 outputted from the sine wave generator 62 by the input data, and outputs the result to the adder 30. The adder 30 adds the input value and a value held in the holding circuit 31, and the sum is held in the holding circuit 31. The squarer 32 squares the value held by the holding circuit 31 and outputs it to the weighting adder 48. Similarly, the multiplier 33 (38, 43) multiplies a cosine wave of the frequency f1 (a sine wave of the frequency f2, a cosine wave of the frequency f2) outputted from the cosine wave generator 63 (the sine wave generator 64, the cosine wave generator 65) by the input data, and outputs the result to the adder 35 (40, 45). The adder 35 (40, 45) adds the input value and a value held in the holding circuit 36 (41, 46), and the sum is held in the holding circuit 36 (41, 46). The squarer 37 (42, 47) squares the value held by the holding circuit 36 (41, 46) and outputs it to the weighting adder 48.

Next, the operation will be described. A digital signal of "0" or "1" from the precoder 52 is inputted to the frequency component extractor 54. In the following description of calculations of the frequency components, however, the input of "0" is dealt as an input of a waveform of "−1". The frequency component extractor 54 extracts the levels of DC component, pilot component, and notch.

First, the method of extracting DC and pilot components will be described. The adder 21 adds the input value of "−1" or "1" and the value of the holding circuit 22, and the result is held in the holding circuit 22, thereby calculating the DSV. When the DSV is converged to the vicinity of 0, the DC component is eliminated. When the DSV is periodically varied, furthermore, the pilot component can be generated. In the following, a case where a pilot signal of the frequency f1 is generated will be described as an example.

The known DSV generator 24 generates a DSV (known DSV) which has a period of the frequency f1 and is a rectangular wave. The subtracter 23 calculates the difference between the DSV of the input signal and the known DSV. When the state of the switch 61 in FIG. 3 is changed so as to output a signal from which a smaller difference is obtained, it is possible to generate a signal which has no DC component and includes a pilot signal of the frequency f1.

Next, the method of extracting a notch component will be described. In the example, notch components of the frequencies f1 and f2 are extracted. In the case where the notch frequencies include a pilot signal, the pilot component is previously subtracted from the input signal so that a notch is generated in the vicinity of the pilot signal. When notch components of a signal including a pilot signal of the frequency f1 are to be extracted, for example, the known data generator 27 generates a data (known data) of "−1" or "1" having a DSV, the period of which is identical with that of the known DSV, and the subtracter 26 obtains a difference between the input signal and the known data.

Then the multiplier 28 multiplies $\sin\omega_1 t$ it outputted from the sine wave generator 62 by the input data, the adder 30 adds the multiplication result to the value of the holding circuit 31, and the addition result is held. The squarer 32 squares the held value. The same operations are then conducted on $\cos\omega_1 t$, $\sin\omega_2 t$, and $\cos\omega_2 t$. Specifically, the multiplier 33 (38, 43) multiplies $\cos\omega_1 t$ ($\sin\omega_2 t$, $\cos\omega_2 t$) outputted from the cosine wave generator 63 (the sine wave generator 64, the cosine wave generator 65) by the input data. The adder 35 (40, 45) adds the multiplication result to the value of the holding circuit 36 (41, 46), and the addition result is held. The squarer 37 (42, 47) squares the held value. In the same manner as the case where frequency components are extracted by means of the Fourier transform and the output is selected, the output determiner 58 of FIG. 3 compares the sums of the square results with each other, and the state of the switch 61 is changed so as to output a signal from which a smaller sum is obtained. As a result, a notch, and a notch in the vicinity of the pilot signal are generated in the frequency spectrum of the code data.

The weighting adder 48 conducts a weighted addition on the calculation results of the DC and pilot components and those of the notch components, whereby the level ratio of the components can be changed. When the pilot component is to be increased, the weighting factor for the calculation results of the pilot component is increased.

The 8–10 conversion which is a prior art record modulation system is conducted as described above, and has a low conversion efficiency of 80%. A conversion efficiency is used as an index for attaining a high density recording in a digital magnetic recording/reproduction apparatus. In order to attain a higher density recording, consequently, the conversion efficiency has to be improved.

When such a prior art encoding apparatus is used, a notch appears in the code data, and therefore the Q of a BPF of a pilot signal detector of the tracking servo system using a digital pilot tone can be reduced, thereby producing advantages that a tracking servo is stabilized and a reproduction circuit can be manufactured at a low cost. If the width of a notch can be increased, these advantages can be further improved.

SUMMARY OF THE INVENTION

It is an object of the invention to provide a data conversion apparatus which can generate a pilot signal suitable for tracking control while maintaining a high coding efficiency.

It is another object of the invention to provide a data conversion apparatus which can add a pilot signal required in a track narrowing process, which is a technique for attaining a high density recording.

It is a further object of the invention to provide an encoding apparatus which can widen a notch of the frequency spectrum of the code data, and further improve the stabilization of a tracking servo and the economization of a reproduction circuit.

The data conversion apparatus of a first invention is an apparatus which converts an m-bit data into plural n-bit codes having different CDS values, thereby obtaining an intense spectrum at frequencies with a period of p bits, and has: means for generating data of a known CDS in codeword with one period which is the least common multiple (q) of n and p; means for detecting differences between values of charge in codeword at intervals of (r) bits (where r is the greatest common divisor of n and p) and the data of the known CDS; means for detecting a sum of absolute values of an (n/r) number of the differences of each of the n-bit codes; and means for selecting a code having the smallest sum of absolute values from the plural n-bit codes having different CDS values.

According to the data conversion apparatus of the first invention, a coding process is conducted on the basis of values of charge in codeword and data of the known CDS which indicate information finer than that indicated by the CDS of a codeword. Therefore, it is possible to obtain a high frequency pilot signal which is close to the coding frequency. For one data, moreover, plural codewords in which code data do not propagate to the next coding process are generated, and therefore the coding constraint length of the data conversion apparatus can be shortened. As a result, even a circuit of small scale can generate a high frequency pilot signal which is close to the coding frequency.

The data conversion apparatus of a second invention is an apparatus which adds "0" or "1" to an MSB of an m-bit data to convert the data into plural (m+1)-bit codes having different CDS values, thereby obtaining an intense spectrum at frequencies with a period of p bits, and has: means for accumulating plural or an (s) number of the data to be coded; means for generating data of a known CDS in codeword with one period which is the least common multiple (q) of m+1 and p; means for detecting differences between values of charge in codeword at intervals of (r) bits (where r is the greatest, common divisor of m+1 and p) and the data of the known CDS; means for selectively switching MSBs of the accumulated plural data on which the addition is to be conducted; and means for selecting a combination of codewords having the smallest sum of absolute values of the differences from at, (n/r)×s number of accumulated codes.

According to the data conversion apparatus of the second invention, plural data to be coded are accumulated, MSBs of the accumulated plural data on which the addition is to be conducted are selectively switched, and a coding process is conducted on the basis of values of charge in codeword and data of the known CDS which indicate information finer than that indicated by the CDS of a codeword. Therefore, it is possible to obtain a high frequency pilot signal which is close to the coding frequency while adding to the data a redundancy bit which is minimum or 1 bit. As a result, a high frequency pilot signal which is close to the coding frequency can be generated with high coding efficiency.

The data conversion apparatus of a third invention is an apparatus which converts an m-bit data into plural n-bit codes having different CDS values, thereby obtaining an intense spectrum at frequencies with a period of p bits, and has: means for accumulating DSV of preceding codes; means for generating data of a known DSV with one period which is the least common multiple (q) of n and p; means for adding values of charge in codeword at intervals of (r) bits (where r is the greatest common divisor of n and p) to the DSV of preceding codes; means for detecting a difference between DSV obtained by the addition and at intervals of r bits and the data of the known DSV; means for detecting a sum of absolute values of an (n/r) number of the differences of each of the n-bit codes; and means for selecting a code having the smallest sum of absolute values from the plural codes having different CDS values.

According to the data conversion apparatus of the third invention, a coding process is conducted on the basis of values of charge in codeword and data of the known DSV which indicate information finer than that indicated by the CDS of a codeword. Therefore, it is possible to obtain a high frequency pilot signal which is close to the coding frequency while suppressing lower components. For one data, moreover, plural codewords in which code data do not propagate to the next coding process are generated, so that the coding constraint length of the data conversion apparatus can be shortened. As a result, even when a circuit of small scale is used, a signal waveform distortion due to phase distortion in a lower region is improved while generating a high frequency pilot signal which is close to the coding frequency, thereby improving code error.

The data conversion apparatus of a fourth invention is an apparatus which adds "0" or "1" to an MSB of an m-bit data to convert the data into plural (m+1)-bit codes having different CDS values, thereby obtaining an intense spectrum at frequencies with a period of p bits, and has: means for accumulating DSV of preceding codes; means for accumulating plural or an (s) number of the data to be coded; means for generating data of a known DSV with one period which is the least common multiple (q) of m+1 and p; means for adding values of charges in codeword at intervals of (r) bits (where r is the greatest common divisor of m+1 and p) to the DSV of preceding codes; means for detecting a difference between DSV obtained by the addition and at intervals of r bits and the data of the known DSV; means for selectively switching an MSB of the accumulated plural data on which the addition is to be conducted; and means for selecting a combination of codewords having the smallest sum of absolute values of the differences from an (n/r)×s number of accumulated codes.

According to the data conversion apparatus of the fourth invention, plural data to be coded are accumulated, MSBs of the accumulated plural data on which the addition is to be conducted are selectively switched, and a coding process is conducted on the basis of values of charge in codeword and data of the known CDS which indicate information finer than that indicated by the CDS of a codeword. Therefore, it is possible to obtain a high frequency pilot signal which is close to the coding frequency, while suppressing lower components with using a redundancy bit of 1 bit, whereby the coding efficiency can be improved and the coding constraint length of the data conversion apparatus can be shortened. As a result, a signal waveform distortion due to phase distortion in a lower region is improved while generating a high frequency pilot signal which is close to the coding frequency, thereby improving code error.

The encoding apparatus of a fifth invention is an apparatus which conducts an extraction of sine and cosine components of each of N frequencies on two kinds of (m+1)-bit data strings to which 1 bit of "0" or "1" is added at intervals of m bits, selects from the two kinds of data strings one data string in which frequency components increase or decrease with a greater degree, using at least the extracted components, and outputs the selected data string, and has: means for providing at least one of the extracted sine and cosine components with a weighting factor; means for selecting from the two kinds of data strings one data string in which frequency components increase or decrease with a greater degree, with using a result of the weighted sine and cosine components; and means for outputting the selected data string.

According to the encoding apparatus of the fifth invention, using a result obtained by providing at least one of the extracted sine and cosine components with a weight factor, one data string in which frequency components increase or decrease with a greater degree is selected and outputted from two kinds of (m+1)-bit data strings to which 1 bit of "0" or "1" is added at intervals of m bits. Consequently, the width of a notch of a coded signal and the level of the pilot signal can be increased. Therefore, the Q of a BPF of a pilot signal detector in a reproduction process can be reduced, and the circuit can be produced at a cost reduced in accordance with the reduction in the Q.

The encoding apparatus of a sixth invention is a modification of the fifth invention; wherein the weighting factor is decided so that, for a sum of the sine and cosine components, at least one of which is provided with the weighting factor, an output obtained in the phase difference range of 0° to 180° is not greater than an output obtained at 180° in phase difference-output characteristics of an input signal and a pilot signal.

According to the encoding apparatus of the sixth invention, when a weighting factor is to be decided, the level variation of the pilot signal can be reduced, and hence a tracking servo can be conducted stably.

The above and further objects and features of the invention will more fully be apparent from the following detailed description with accompanying drawings.

BRIEF DESCRIPTION OF THE DRAWINGS

FIG. 2 is a diagram illustrating the configuration of codes used in a prior art data conversion apparatus;

FIG. 11 is a diagram showing relationships between the generation of code data and the CDS in embodiment 2;

DESCRIPTION OF THE PREFERRED EMBODIMENTS

The invention will be described with reference to the drawings showing the embodiments thereof.

Embodiment 1

Figure 5:
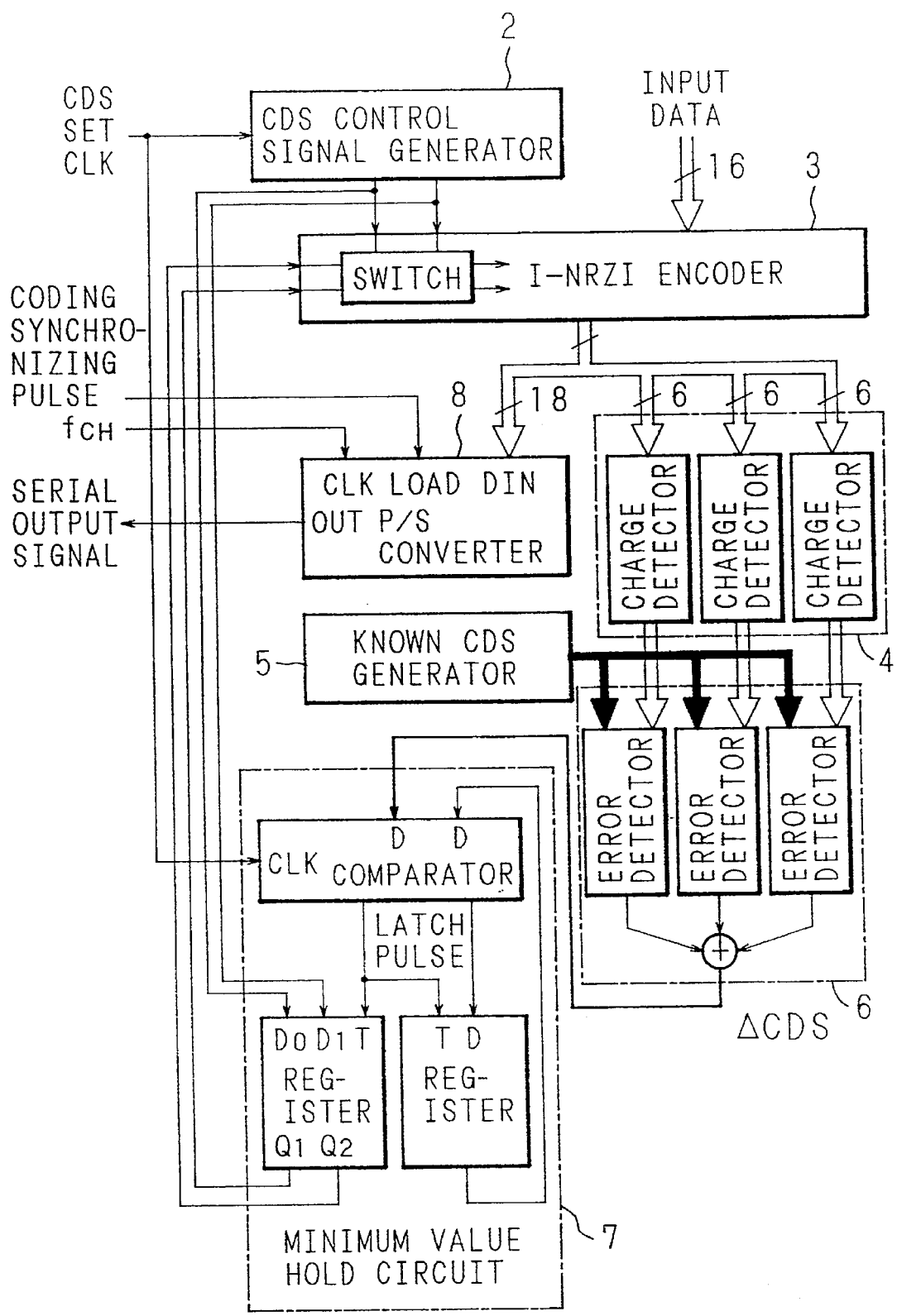
FIG. 5 is a block diagram showing the configuration of a data conversion apparatus of embodiment 1 of the invention.

Embodiment 1 will be described. FIG. 5 is a block diagram showing the configuration of a data conversion apparatus of embodiment 1. Numeral 2 denotes a CDS control signal generator which outputs a 2-bit signal for generating plural codewords having different CDS values, and 3 denotes an I-NRZI encoder which receives parallel input data of 16 bits and a 2-bit CDS control signal in parallel and performs 18-bit parallel I-NRZI modulation. The I-NRZI encoder 3 outputs an 18-bit parallel I-NRZI modulation signal to a charge detector 4 while splitting the 18-bit parallel signal into three 6-bit units. The charge detector 4 detects the values of charge in codeword of the three 6-bit units, and outputs the detected values to an error detector 6. The error detector 6 receives from a known CDS generator 5 a CDS value in codeword for obtaining DSV variation ideal for generating a pilot signal. The error detector 6 obtains a difference between the ideal CDS in codeword from the known CDS generator 5 and the value of charge in codeword of each of the 6-bit units obtained in the charge detector 4, and outputs a sum of absolute values (ΔCDS) of the obtained differences to a minimum value hold circuit 7 which consists of a comparator and registers. The minimum value hold circuit 7 detects CDS control signal conditions under which the minimum absolute value sum (ΔCDS) is obtained, and outputs the detected CDS control signal conditions to the I-NRZI encoder 3. A P/A(parallel/serial) converter 8 outputs parallel I-NRZI data of 18 bits which are outputted from the I-NRZI encoder 3 under the CDS control signal conditions, as serial data.

Figure 6:
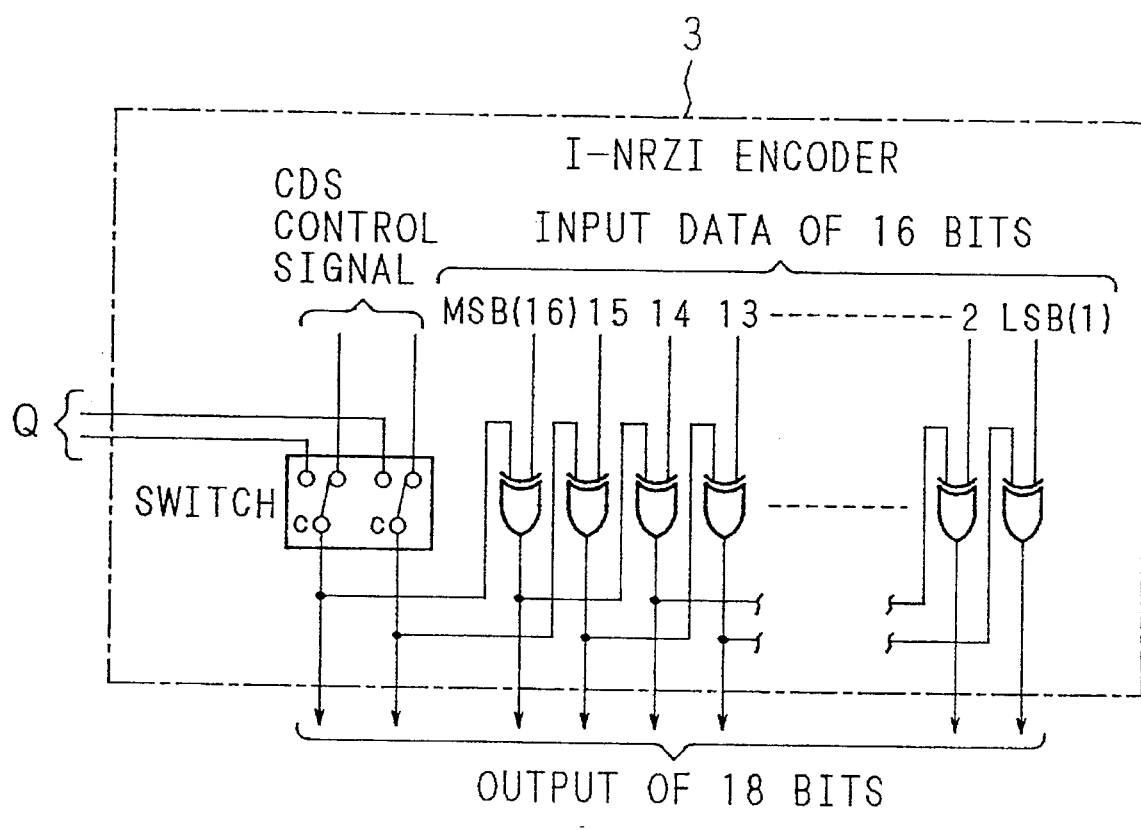
FIG. 6 is a circuit diagram of an I-NRZI encoder of embodiment 1.
Figure 7:
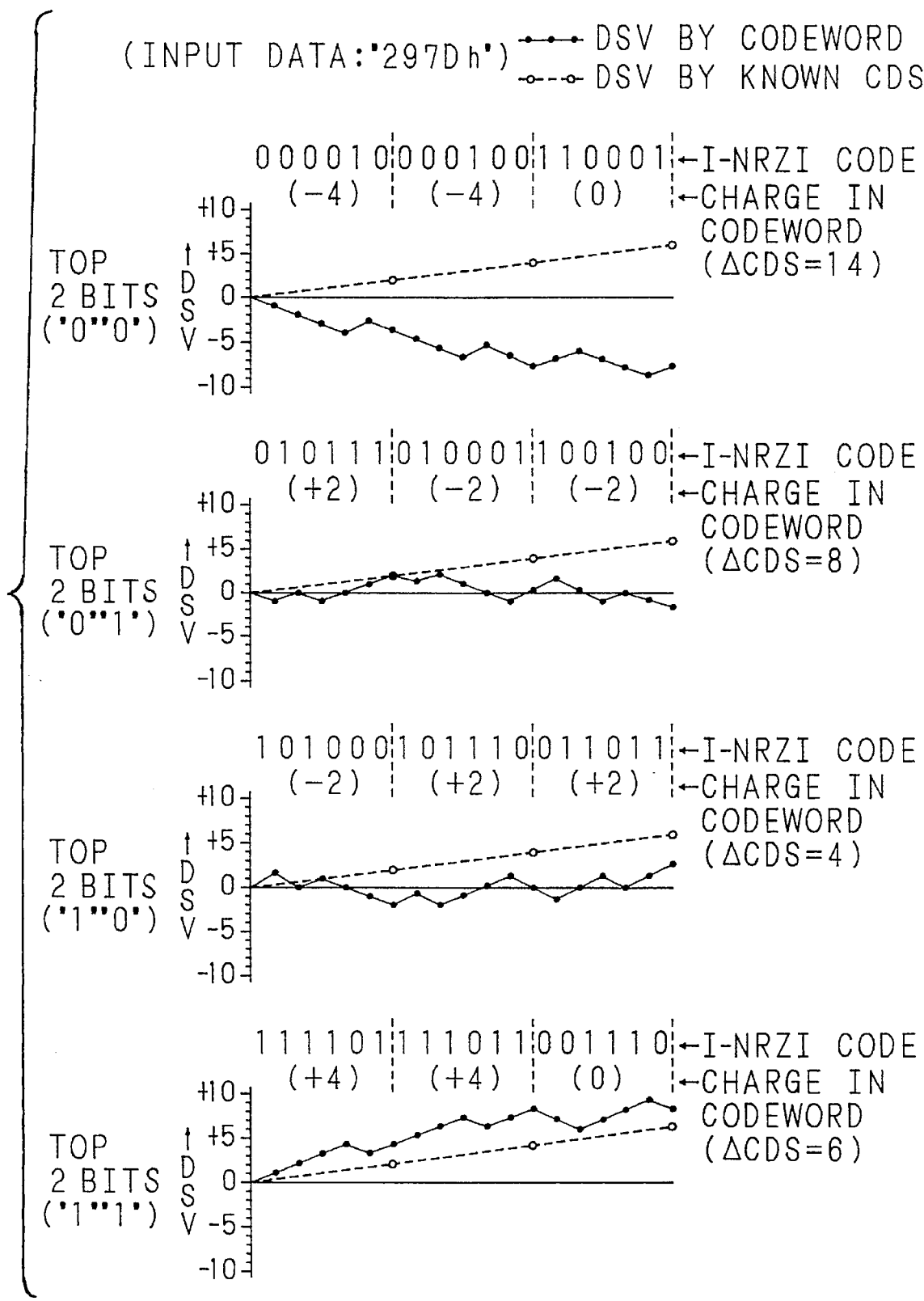
FIG. 7 is a diagram showing the generation of code data and DSV variation in embodiment 1.
Figure 8:
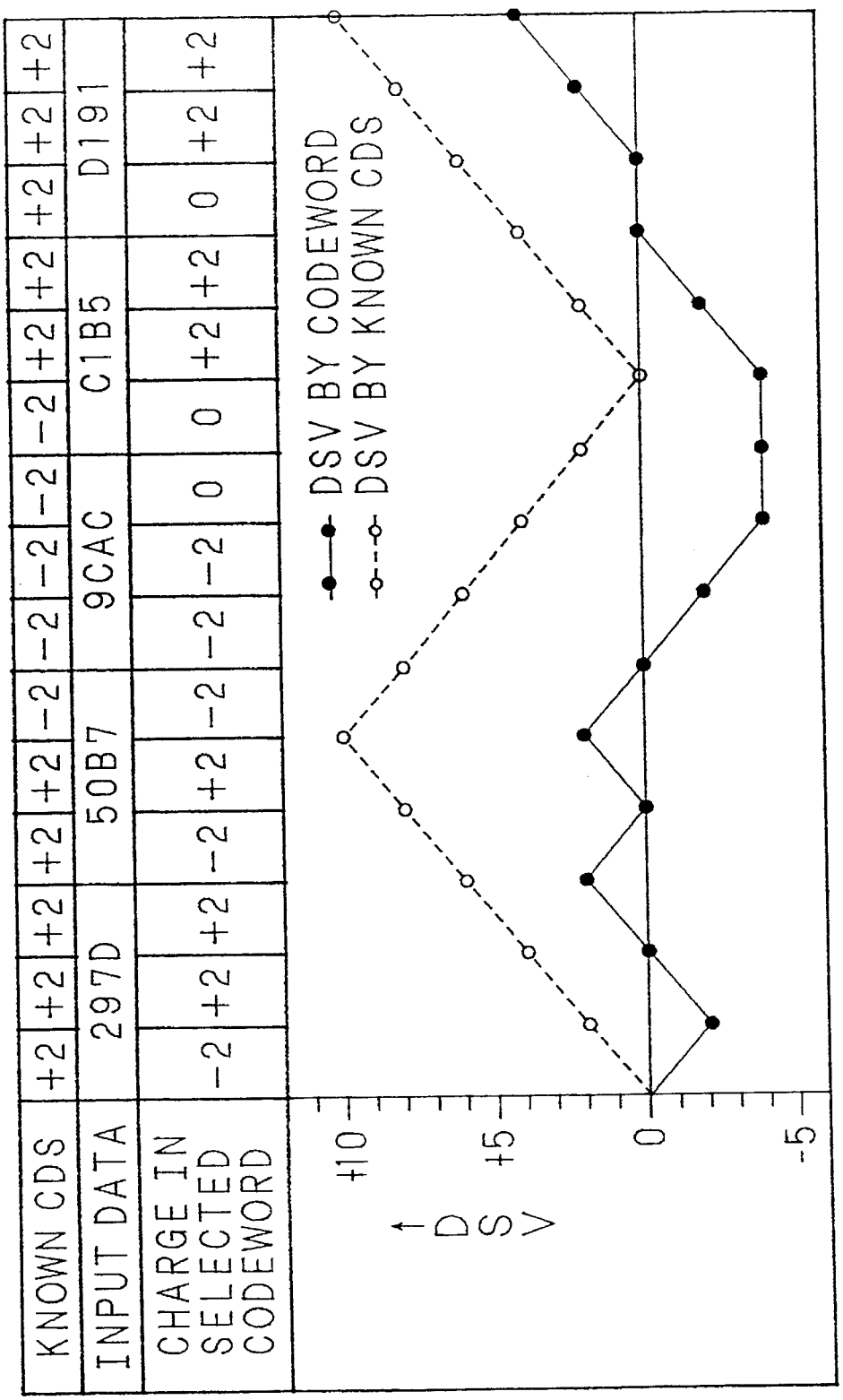
FIG. 8 is a diagram comparing DSV variation of a codeword string in embodiment 1 with DSV variation due to a known CDS.

FIGS. 6 to 8 are drawings for supplementarily illustrating the operation of FIG. 5. FIG. 6 is a diagram of an internal configuration of the I-NRZI encoder 3, and FIGS. 7 and 8 are diagrams illustrating relationships between code data and the DSV. In order to further clarify the invention, a data conversion method which can generate a pilot signal from a binary digital signal string will be described.

A power spectrum of digital data indicated by binary levels of "0" or "1" is affected by the state transition probability. In other words, a power spectrum of data which are uniformly random is substantially flat in a range from DC to the data transmission frequency. When the "0" and "1" levels of digital data are respectively assumed to be −1 and +1, the total sum of transmission data is called a DSV. By making the DSV a finite value, a low suppressed power spectrum which is free from DC component is obtained. When the DSV is periodically varied, furthermore, an intense spectrum is obtained at a frequency corresponding to the variation period so that it can be used as a pilot signal. In other words, means for accurately controlling the DSV of a codeword string is essential to generate a pilot signal.

The 2-frequency pilot ATF system requires plural pilot frequencies. Hereinafter, operations of various portions of embodiment 1 in the case where a pilot signal frequency of fCH/60 (where fCH is a transfer frequency of a serial data) is generated will be described.

The input data of the I-NRZI encoder 3 is a 16-bit random video or speech signal which is digitized, and assumed to be, for example, "297Dh". The 2-bit output of the CDS control signal generator 2 is added to the MSB side of the input data to form 18-bit parallel data. In accordance with the added 2-bit pattern, the I-NRZI encoder 3 generates four kinds of I-NRZI signals having different CDS values as shown in FIG. 7. As a result, the coding frequency is fCH/18.

On the other hand, a pilot signal to be generated has a frequency of fCH/60, and the coding frequency is not an integer multiple of the pilot signal frequency. Therefore, it is very difficult to manage the CDS for each codeword and obtain DSV variation corresponding to the pilot signal frequency from the codeword string, resulting in that means for splitting the codewords into periods each of which is an integer multiple of the pilot signal frequency and for managing values of charge in split codewords is required. In embodiment 1, consequently, charges in codewords are managed in the unit of 6 bits which is the greatest common divisor of the number of coding bits: 18 and the number of bits of the pilot signal period: 60. Accordingly, the 18-bit parallel I-NRZI modulation signal is split into three 6-bit units. The charge detector 4 detects the values of charge in codewords (sums obtained when the "0" level is assumed to be −1 and the "1" level to be +1) of the three 6-bit units. The four kinds of 2-bit signals to be added must be given within the coding period at a rate corresponding to 4 steps or more. Using a clock signal CDS SET CLK supplied to the CDS control signal generator 2, the 2-bit signals are generated within the coding period at a rate corresponding to 6 steps.

The known CDS generator 5 generates a known CDS in codeword signal which has a CDS value of a 6-bit period and of +2 or −2 and from which triangular wave-like DSV variation is obtained at a period of fCH/60 as shown in FIG. 8. The known CDS signal functions as a signal for obtaining an error of a value of charge in codeword from an ideal value, and corresponds to a charge in split codeword in one-to-one relationship. Therefore, 3-bit signals are outputted as a signal for 3 codeword divisions (each bit of the known CDS value is +2 at Low or −2 at High). Since the coding frequency (fCH/18) is not an integer multiple of the pilot signal frequency (fCH/60), the correspondence between the known CDS in codeword signal and values of charge in codeword is done at a period of 180×(1/fCH) which is the least common multiple of the coding period and the pilot period, in the view point of ensuring the sampling point phase.

The error detector 6 detects the difference between the known CDS in codeword signal and values of charge in codeword at intervals of 6 bits, and outputs the absolute value sum (ΔCDS) of the differences of the charges in 3-split codeword, to the minimum value hold circuit 7. The minimum value hold circuit 7 consists of a comparator for conducting a comparison on the ΔCDS, and registers for storing the ΔCDS and the top 2-bit signal of the I-NRZI modulation signal at that time. The minimum value hold circuit 7 generates a latch pulse so that (1) the minimum ΔCDS for four kinds of I-NRZI signals, having different CDS values and supplied in a time sharing manner in accordance with CDS SET CLK, and (2) the top 2-bit signal at that time are stored in the registers, and so that the registers hold their contents.

The top 2-bit signal latched in the register of the minimum value hold circuit 7 which corresponds to the minimum is returned to the I-NRZI encoder 3. In the I-NRZI encoder 3, the 2-bit signal supplied from the CDS control signal generator 2 is replaced with the returned top 2-bit signal by means of a switch in the encoder so that the returned top 2-bit signal is inputted as the top 2-bit signal for the I-NRZI encoder 3, and I-NRZI modulation is then conducted. In response to a coding synchronizing pulse, the 18-bit parallel signal which has been modulated is loaded into the P/S converter 8. The parallel signal is converted into a serial signal in accordance with a clock of the data transmission frequency fCH, and then outputted to a transmission line.

The same operations are conducted in each coding so as to maintain the output of codewords attaining the minimum ΔCDS, thereby obtaining a codeword string having DSV variation which is similar to DSV variation ideal for generating a pilot signal in accordance with the known CDS.

As an example of such a coding, FIG. 8 shows a comparison of ideal DSV variation and DSV variation of a codeword string in the case where data "50B7h", "9CACh", "C1B5h", "D191h", and "024Dh" are input in succession to "297Dh".

Embodiment 2

Figure 9:
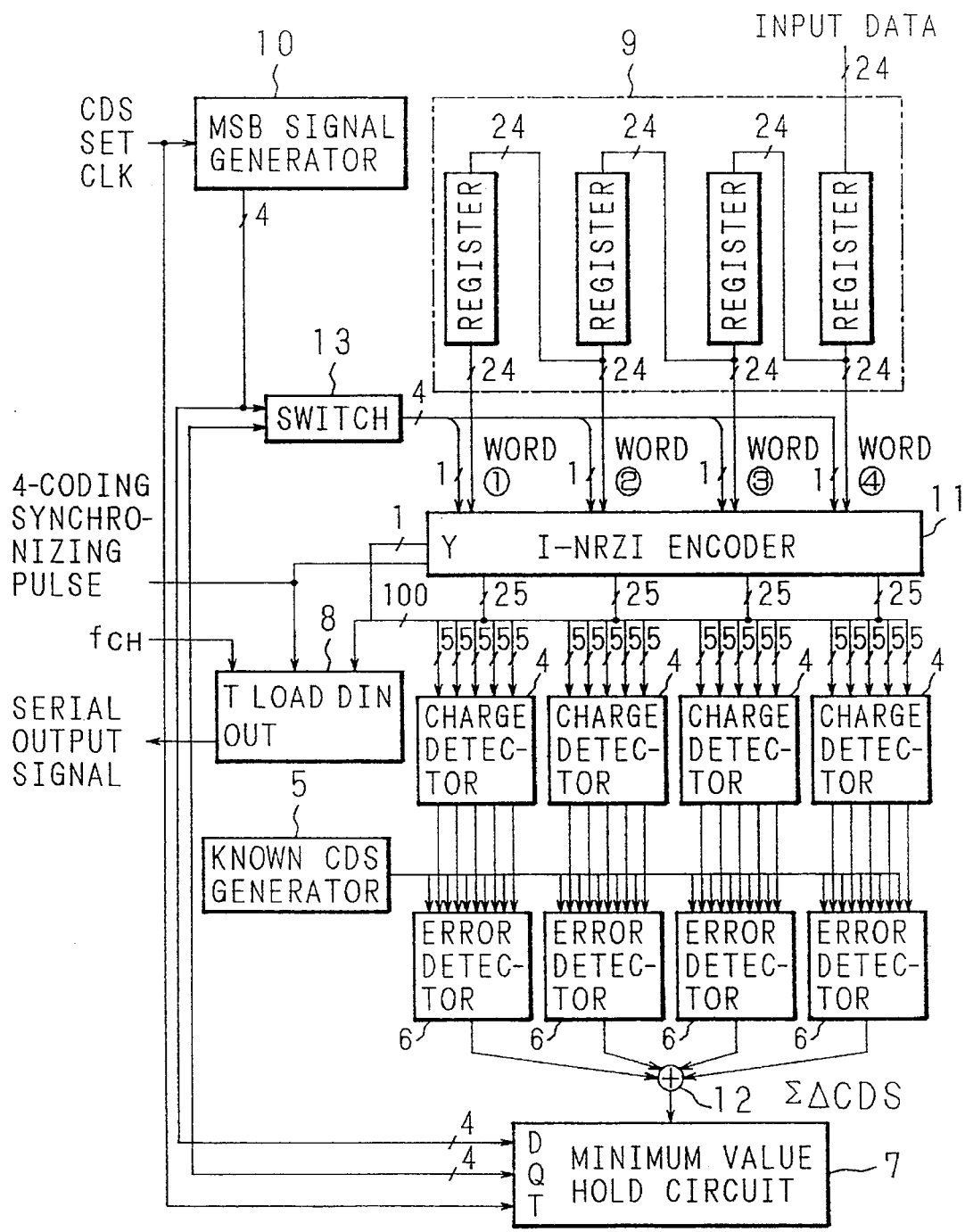
FIG. 9 is a block diagram showing the configuration of a data conversion apparatus of embodiment 2 of the invention.
Figure 10:
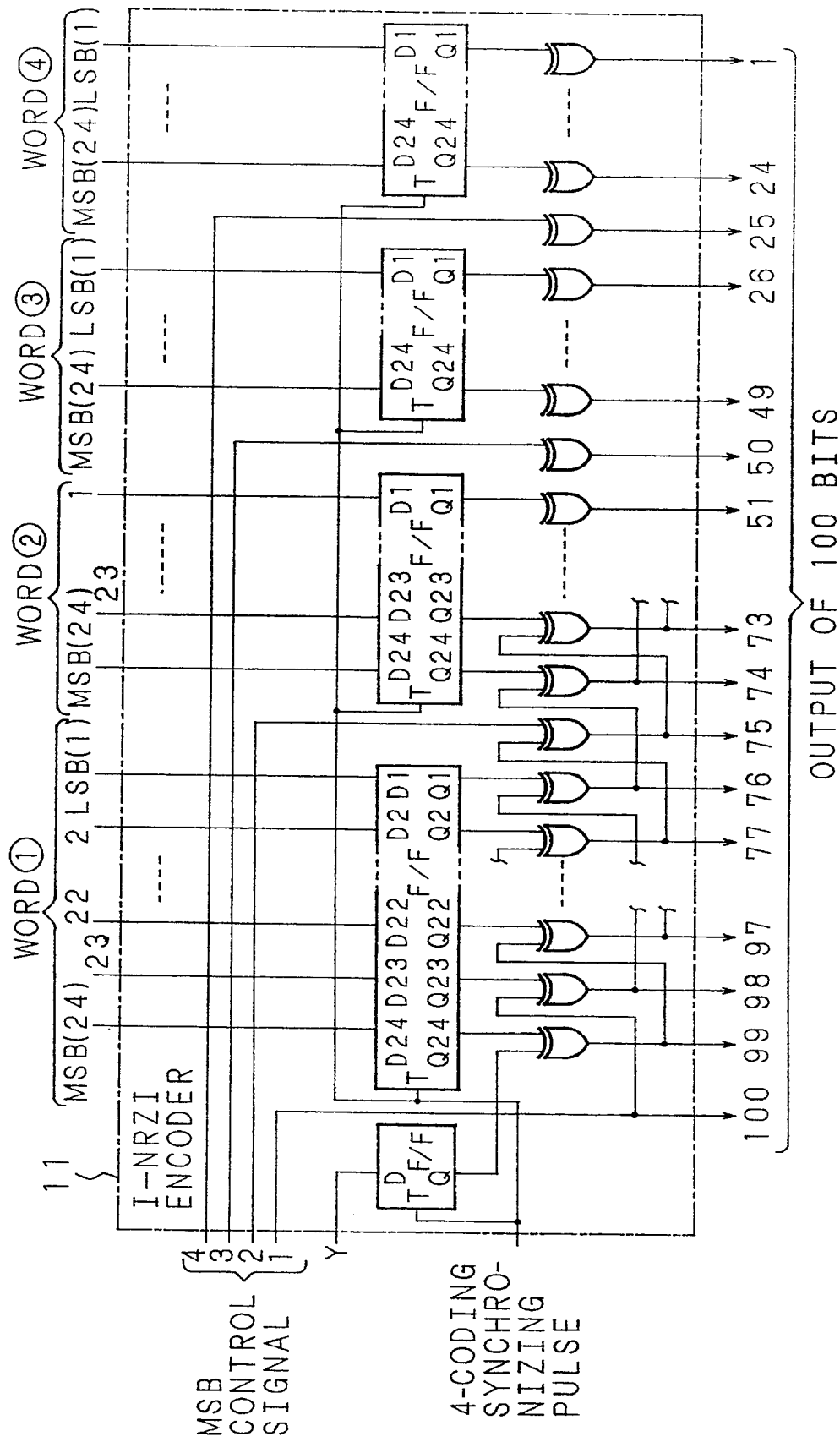
FIG. 10 is a circuit diagram of an I-NRZI encoder of embodiment 2.

Next, embodiment 2 will be described. FIG. 9 is a block diagram of a data conversion apparatus of embodiment 2. Components identical with those in FIG. 5 are denoted by the same numerals, and their description is omitted. Numeral 9 denotes a register which stores 4 words of data inputted in the unit of 24 bits, 10 denotes a MSB signal generator which generates a signal to be added to the MSB of each of 4 data words from the register 9, 11 denotes an I-NRZI encoder which performs I-NRZI modulation on 100-bit parallel data from the register 9, 12 denotes an adder which adds up ΔCDSs from four error detectors 6 for 4 words, and 13 denotes a switch which selects a signal to be added to the MSB of each of the 4 data words from the register 9. FIG. 10 is a circuit diagram showing the configuration of the I-NRZI encoder 11 shown in FIG. 9, and FIG. 11 is a diagram showing the operation of embodiment 2.

In order to clarify the effectiveness of embodiment 2, I-NRZI modulation will be described. I-NRZI modulation is a coding system in which a coded signal is delayed by 2 bits and EXORed with data bits. In a coding process in which I-NRZI modulation is conducted while adding a 1-bit control signal to a data word of even bits, influence of the added control bit propagates to the next coded word, and hence the coding is conducted in the unit of plural words. Therefore to implement an encoding process for performing a coding process which has a higher coding efficiency than embodiment 1 and in which a 1-bit CSD control signal is added to a 24-bit data word, an apparatus configured to account of the influence of such propagation is necessary.

Next, the operation of embodiment 2 will be described. The register 9 converts 24-bit parallel input data into 4-word 96-bit parallel data. The MSB signal generator 10 generates in a time sharing manner 16 kinds of 4-bit signals of "0000" to "1111" in order to control a CDS of a codeword. Each bit of the signals is added through the switch 13 to the MSB of each word of the 4-word parallel data, as a CDS control bit. The generation of the signals of 16 kinds is conducted in accordance with the clock signal CDS SET CLK, and the rate is set so as to correspond to 20 steps because 16 steps or more must be ensured in fCH/100. The I-NRZI encoder 11 receives data of 25 bits×4 words, which are obtained by adding a 1-bit control bit to 24-bit data, and the end bit (Y signal) of the I-NRZI modulation signal, which has been coded in the immediately preceding coding process. In the I-NRZI encoder 11, I-NRZI modulation is performed on the 100-bit parallel data. As a result, at the output of the I-NRZI encoder 11, a 100-bit parallel I-NRZI modulation signal having 16 conditions (32 states) as shown in FIG. 10 is obtained depending on the conditions of the 4-bit signal from the MSB signal generator 10 and the state of the Y signal.

Next, means for extracting the condition which is most advantageous for the generation of a pilot signal from the 16 conditions will be described. A pilot signal to be generated has a frequency of FCH/60 which is not an integer multiple of the coding frequency (fCH/25). Therefore, it is required to split the codeword and manage values of charge in split codeword in the same manner as embodiment 1, and hence values of charge in codeword are managed in the unit of 5 bits which is the greatest common divisor of the number of coding bits: 25 and the number of bits of the pilot signal period: 60. Accordingly, in the charge detector 4, the 25-bit× 4-word parallel I-NRZI modulation signal is split into twenty 5-bit units. The charge detector 4 detects the values of charge in codeword of the 5-bit units.

The known CDS generator 5 generates a known CDS in codeword signal which has a CDS value of a 5-bit period of +1 or −1 and from which triangular wave-like DSV variation is obtained at a period of fCH/60. The known CDS signal functions as a signal for obtaining an error of a charge in codeword from an ideal value, and corresponds to a value of charge in split codeword in one-to-one relationship. Therefore, a 5-bit signal for each codeword is outputted as a signal for 5 codeword divisions. Since the coding frequency (fCH/25) is not an integer multiple of the pilot signal frequency (fCH/60), the correspondence between the known CDS in codeword signal and values of charge in codeword is done at a period of 300×(1/fCH) which is the least common multiple of the coding period and the pilot period, in the view point of ensuring the sampling point phase.

The four error detectors 6, which are used for 4 words and connected in parallel, detect the difference between the known CDS in codeword signal and values of charge in codeword at intervals of 5 bits, and output the absolute value sum (ΔCDS) of the differences of the values of charge in 5-split codeword, to the adder 12. The adder 12 adds up ΔCDSs of four words, and outputs the resulting ΣΔCDS to the minimum value hold circuit 7. The minimum value hold circuit 7 consists of a comparator for conducting a comparison on the ΣΔCDS, and registers for storing the ΣΔCDS and a 4-bit MSB control signal at that time. The minimum value hold circuit 7 generates a latch pulse so that (1) the minimum ΣΔCDS for 16 kinds of I-NRZI signals, having different CDS values and supplied in a time sharing manner in accordance with CDS SET CLK, and (2) the 4-bit MSB control signal at that time are stored in the registers, and so that the registers hold their contents.

The 4-bit MSB control signal latched in the register of the minimum value hold circuit 7 which corresponds to the minimum ΣΔCDS is returned to the I-NRZI encoder 11 through the switch 13 so that the MSB control signal is replaced with the returned MSB control signal and the returned MSB control signals for 4 words are inputted as signal to be added to the MSB of a 24-bit data. Then I-NRZI modulation is conducted. In response to a 4-coding synchronizing pulse, the modulated parallel signal of 4 words (100 bits) is loaded into the P/S converter 8. The parallel signal is converted into a serial signal in accordance with a clock of the data transmission frequency fCH, and then outputted to a transmission line.

Embodiment 3

Figure 12:
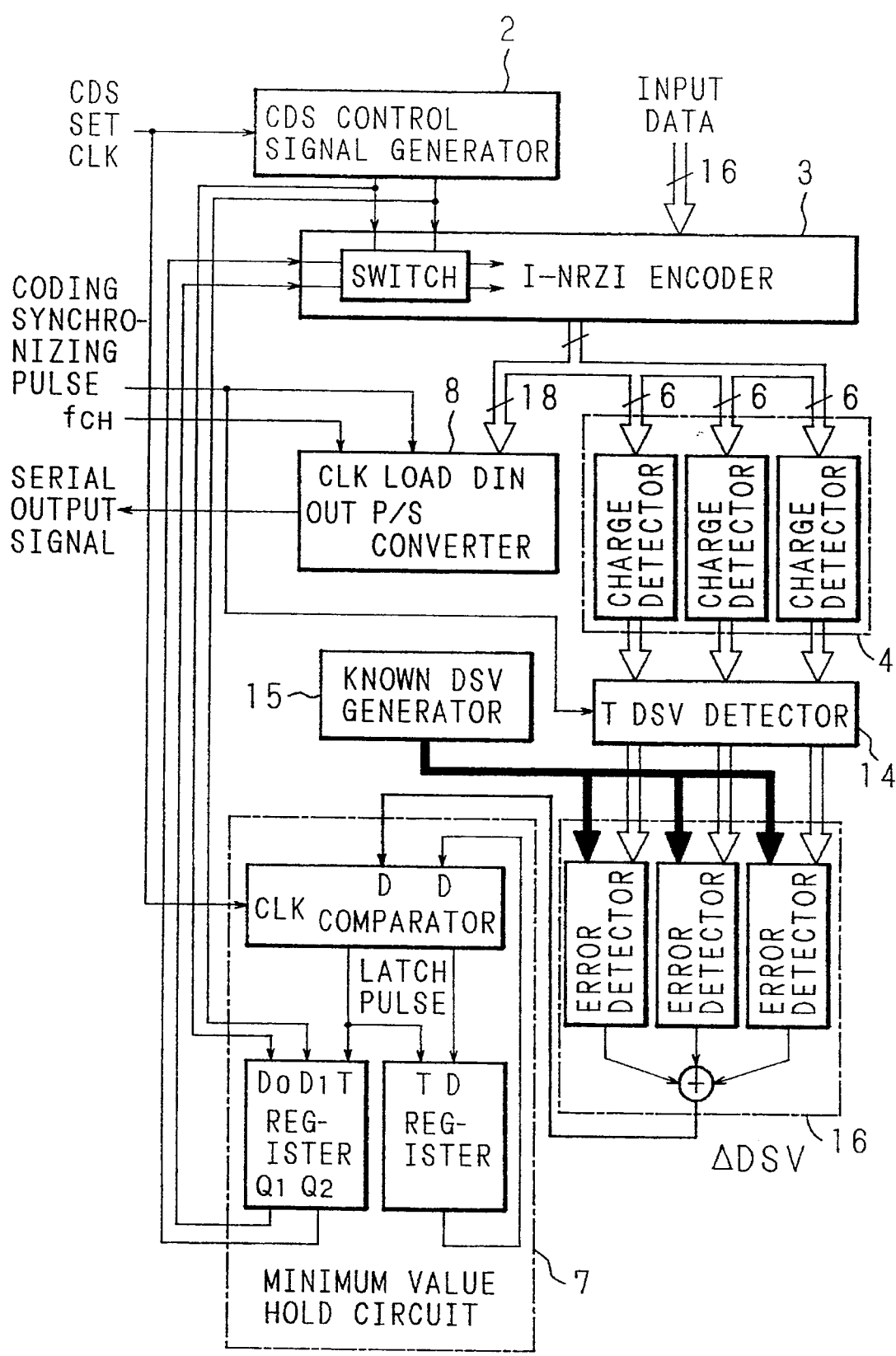
FIG. 12 is a block diagram showing the configuration of a data conversion apparatus of embodiment, 3 of the invention.
Figure 13:
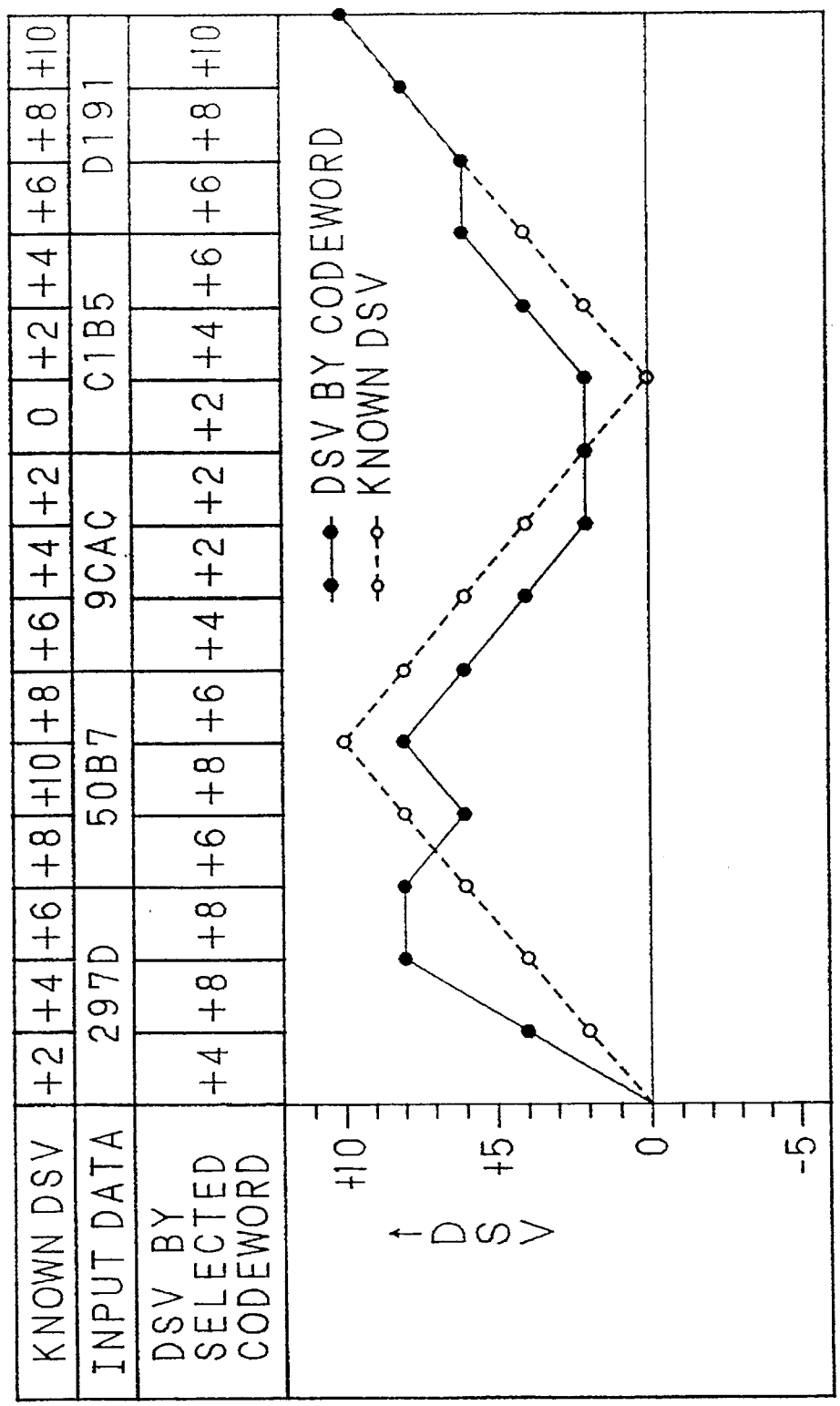
FIG. 13 is a diagram showing the generation of code data and DSV variation in embodiment 3.

Next, embodiment 3 will be described. FIG. 12 is a block diagram of a data conversion apparatus of embodiment 3. Components identical with those of FIG. 5 are denoted by the same numerals, and their description is omitted. Numeral 14 denotes a DSV detector which stores a DSV of a generated I-NRZI codeword string, 15 denotes a known DSV generator which outputs an ideal DSV variation value, and 16 denotes an error detector which obtains an error between a DSV by codeword and a known DSV. Embodiment 3 is an apparatus which can generate a pilot signal identical with that of embodiment 1, and in which data conversion free from DC components is conducted by suppressing divergence of DSVs. Therefore, the I-NRZI modulation means and the charge in codeword detection means may be identical with those of embodiment 1. FIG. 13 is a diagram illustrating the operation of embodiment 3.

Next, the operation will be described. In the same manner as embodiment 1, the input data of the I-NRZI encoder 3 is a 16-bit parallel signal and, for example, "297Dh". Also the number of coding bits, and the pilot signal generation frequency are the same as those of embodiment 1. Consequently, the charge detector 4 is caused to output values of charge in codeword in the 6-bit unit for 3 blocks by the same means as that of embodiment 1. DSV values of preceding codeword strings are accumulated in registers of the DSV detector 14. The value of charge of the codeword inputted from the charge detector 4 and extending from the beginning to the end of each 6-bit block is added to the accumulated DSV value. The resulting data for 3 blocks are outputted as the DSV values from the DSV detector 14 to the error detector 16.

The known DSV generator 15 generates a known DSV in codeword signal which has a CDS value of a 6-bit period of +2 or −2 and from which triangular wave-like DSV variation is obtained at a period of fCH/60 as shown in FIG. 13. The known DSV signal functions as a signal for obtaining an error of each block DSV in codeword from an ideal value, and corresponds to each block DSV in split codeword in one-to-one relationship. Therefore, a signal for 3 words is outputted as a signal for 3 codeword divisions. Since the coding frequency (fCH/18) is not an integer multiple of the pilot signal frequency (fCH/60), the correspondence between the known DSV in codeword signal and the block DSV in codeword is done at a period of 180×(1/fCH), which is the least common multiple of the coding period and the pilot period, from the view point of ensuring the sampling point phase.

The error detector 16 detects the difference between the known DSV in codeword signal and each block DSV in codeword, and outputs the absolute value sum (ΔDSV) of the differences of the block DSVs in 3-split codeword, to the minimum value hold circuit 7. The minimum value hold circuit 7 consists of a comparator for conducting a comparison on the ΔDSV, and registers for storing the ΔDSV and the top 2-bit signal of the I-NRZI modulation signal at that time. The minimum value hold circuit 7 generates a latch pulse so the minimum ΔDSV for four kinds of I-NRZI signals, having different CDS values and supplied in a time sharing manner in accordance with CDS SET CLK, and (2) the top 2-bit signal at that time are stored in the registers, and so that the registers hold their contents.

The top 2-bit signal latched in the register of the minimum value hold circuit 7 which corresponds to the minimum ΔDSV is returned to the I-NRZI encoder 3. In the I-NRZI encoder 3, the 2-bit signal supplied from the CDS control signal generator 2 is replaced with the returned top 2-bit signal by means of a switch so that the returned top 2-bit signal is input as the top 2-bit signal for the I-NRZI encoder 3, and I-NRZI modulation is then conducted. In response to a coding synchronizing pulse, the 18-bit parallel signal which has been modulated is loaded into the P/S converter 8. The parallel signal is converted into a serial signal in accordance with a clock of the data transmission frequency fCH, and then output to a transmission line.

Embodiment 4

Figure 14:
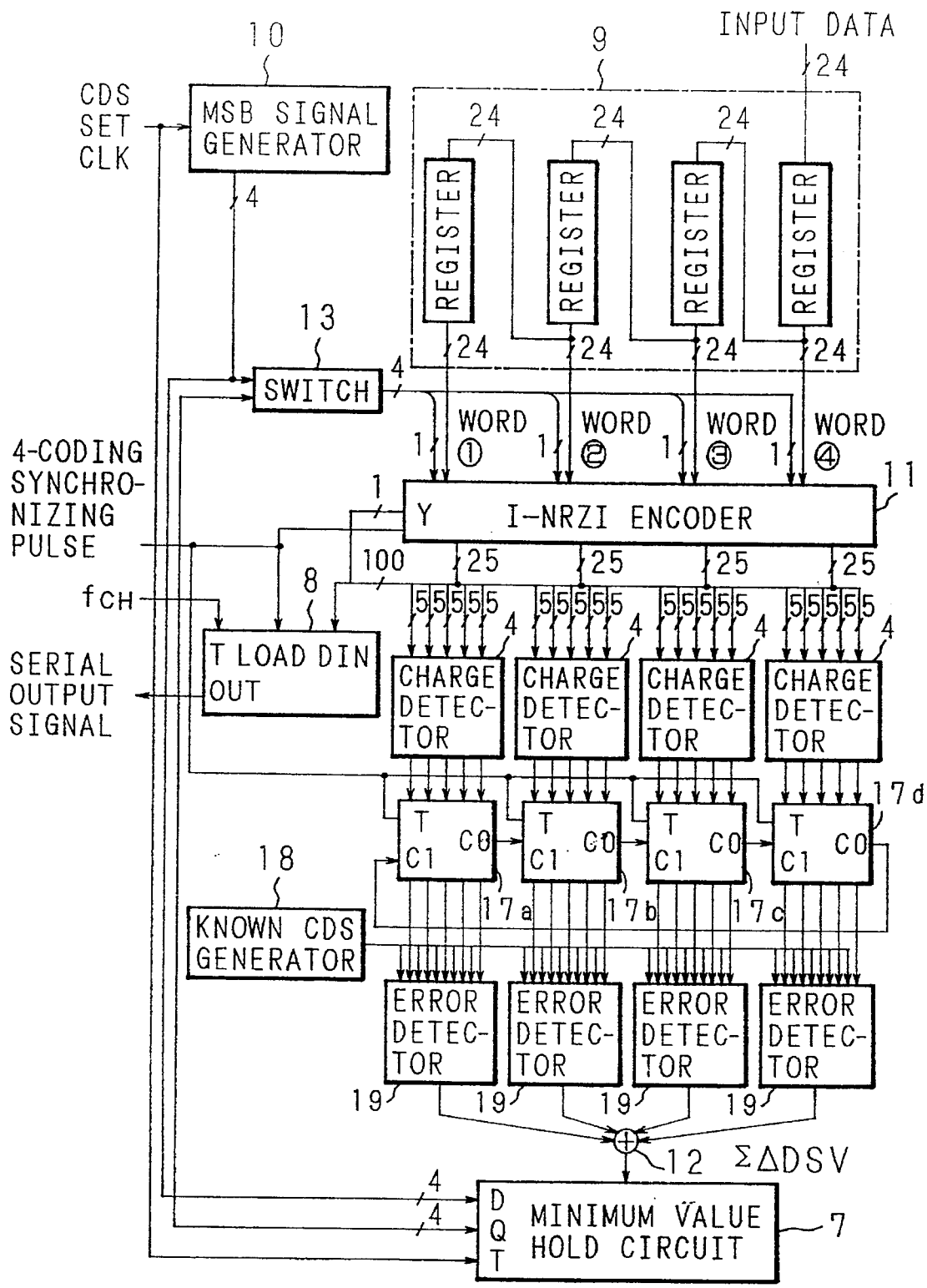
FIG. 14 is a block diagram showing the configuration of a data conversion apparatus of embodiment 4 of the invention.

Next, embodiment 4 will be described. FIG. 14 is a block diagram of a data conversion apparatus of embodiment 4. Components identical with those of FIG. 5 or 9 are denoted by the same numerals, and their description is omitted. Numerals 17a to 17d denote DSV detectors which store a DSV of a generated I-NRZI codeword string, 18 denotes a known DSV generator which outputs an ideal DSV variation value, and 19 denotes an error detector which obtains an error between a DSV by codeword and a known DSV.

Embodiment 4 is an apparatus which can generate a pilot signal identical with as that of embodiment 2, and in which data conversion free from DC components is conducted by suppressing divergence of DSVs. Therefore, the I-NRZI modulation means and the charge in codeword detection means may be identical with those of embodiment 2.

Next, the operation of embodiment 4 will be described. In the same manner as embodiment 2, the register 9 converts 24-bit parallel input data into 4, -word 96-bit parallel data. The MSB signal generator 10 generates in a time sharing manner 16 kinds of 4-bit signals of "0000" to "1111" in order to control the CDS of a codeword. Each bit of the signal is added through the switch 13 to the MSB of each word of the 4-word parallel data as a CDS control bit. The generation of the signals of 16 kinds is conducted in accordance with the clock signal CDS SET CLK, and the rate is set so as to correspond to 20 steps because 16 steps or more must be ensured in fCH/100. The I-NRZI encoder 11 receives data of 25 bits×4 words which are obtained by adding a 1-bit control bit to 24-bit data, and the end bit (Y signal) of the I-NRZI modulation signal which has been coded in the immediately preceding coding process. In the I-NRZI encoder 11, I-NRZI modulation is performed on the 100-bit parallel data. As a result, at the output of the I-NRZI encoder 11, a 100-bit parallel I-NRZI modulation signal having 16 conditions (32 states) as shown in FIG. 10 is obtained depending on the conditions of the 4-bit signal from the MSB signal generator 10 and the state of the Y signal.

Next, means for extracting the condition which is most advantageous for the generation of a pilot signal from the 16 conditions will be described. A pilot signal to be generated has a frequency of fCH/60 which is not an integer multiple of the coding frequency (fCH/25). Therefore, it is required to split the codeword and manage values of charge in the split codeword in the same manner as embodiment 2. Hence, charges in codewords are managed in the unit of 5 bits which is the greatest common divisor of the number of coding bits: 25 and the number of bits of the pilot signal period: 60. Accordingly, in the charge detector 4, the 25-bit×4-word parallel I-NRZI modulation signal is split into twenty 5-bit units. The charge detector 4 detects the values of charge in codewords of the 5-bit units.

DSV values of preceding codeword strings which have been subjected to I-NRZI modulation are accumulated in the DSV detector 17a. The value of charge of the codeword inputted from the charge detector 4 and extending from the beginning to the end of each 5-bit block is added to the accumulated DSV value. The resulting data for 5 blocks are outputted from the DSV detector 17a as the DSV value of the portion up to the end of each block. Furthermore, the DSV value up to the end of the first word to be coded is inputted from the CO terminal of the DSV detector 17a to the DSV detector 17b. The value of charge of the codeword inputted from the charge detector 4 for the second word and extending from the beginning to the end of each 5-bit block is added to the DSV value. The resulting data for 5 blocks are outputted from the DSV detector 17b as the DSV value of the portion up to the end each of block. Similarly, the DSV values of the portions up to the end each of block are obtained by adding the value of charge of the codeword inputted from the charge detector 4 and extending from the beginning to the end of each 5-bit block to the immediately preceding DSV value outputted from the CO terminal of the upstream circuit. The resulting data for 5 blocks are outputted from both the DSV detectors 17c and 17d.

The known DSV generator 18 generates a known DSV in codeword signal which has a CDS value of a 5-bit period of +1 or −1 and from which triangular wave-like DSV variation is obtained at a period of fCH/60 as shown in FIG. 13. The known DSV signal functions as a signal for obtaining an error of each block DSV in codeword from an ideal value, and corresponds to each block DSV in split codeword in one-to-one relationship. For each codeword, therefore, a signal for 5 words is outputted as a signal for 5 blocks. In the embodiment, furthermore, known DSV signals for 20 blocks are generated in order to conduct the coding in the unit of a 4-input data word. Since the coding frequency (fCH/25) is not an integer multiple of the pilot signal frequency (fCH/60), the correspondence between the known DSV in codeword signal and the block DSV value in codeword is done at a period of 300×(1/fCH) which is the least common multiple of the coding period and the pilot period, from the view point of ensuring the sampling point phase.

The four error detectors 19, which are used for 4 words and are connected in parallel, detect the difference between the known DSV signal at intervals of 5 bits and each block DSV value in codeword, and output the absolute value sum (ΔDSV) of the differences of the values of charge in 5-split codeword to the adder 12. The adder 12 adds up ΔDSVs of four words, and outputs the resulting ΣΔDSV to the minimum value hold circuit 7. The minimum value hold circuit 7 consists of a comparator for conducting a comparison on the ΣΔDSV, and registers for storing the ΣΔDSV and a 4-bit MSB control signal at that time. The minimum value hold circuit 7 generates a latch pulse so that (1) the minimum ΣΔCDS for 16 kinds of I-NRZI signals, having different CDS values and supplied in a time sharing manner in accordance with CDS SET CLK, and the 4-bit MSB control signal at that time are stored in the registers, and so that the registers hold their contents of the registers.

The 4-bit MSB control signal from latched in the register of the minimum value hold circuit 7 which corresponds to the minimum ΣΔDSV is returned to the I-NRZI encoder 11 through the switch 13 so that the MSB control signal is replaced with the returned 4-bit MSB control signal, and the returned 4-bit MSB control signals for 4 words are inputted as a signal to be added to the MSB of 24-bit data. Then I-NRZI modulation is conducted. In response to a 4-coding synchronizing pulse, the modulated parallel signal of 4 words (100 bits) is loaded into the P/S converter 8. The parallel signal is converted into a serial signal in accordance with a clock of the data transmission frequency fCH, and then outputted to a transmission line.

Embodiment 5

Figure 1:
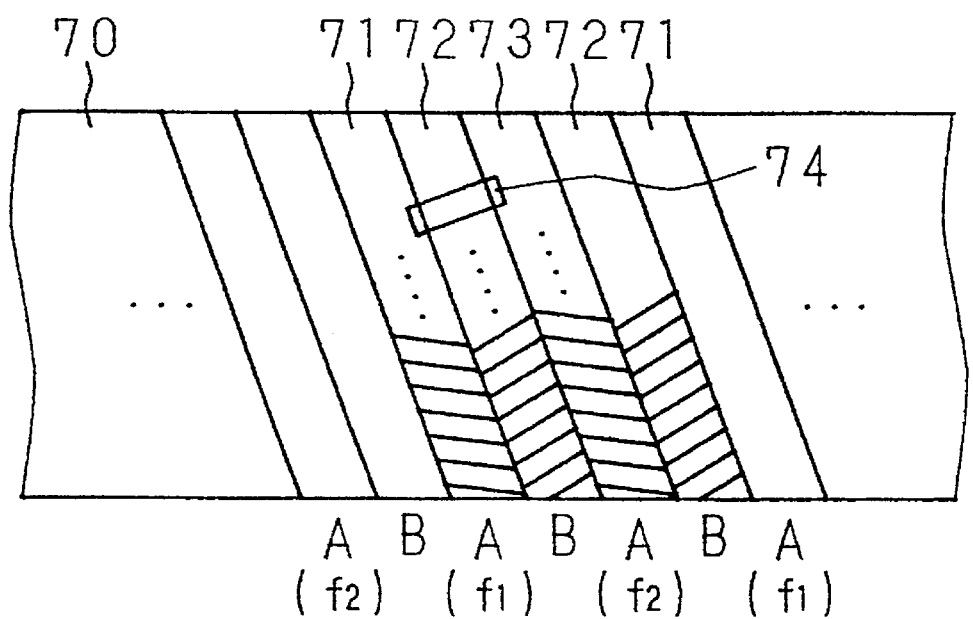
FIG. 1 is a diagram of an ATF servo.
Figure 3:
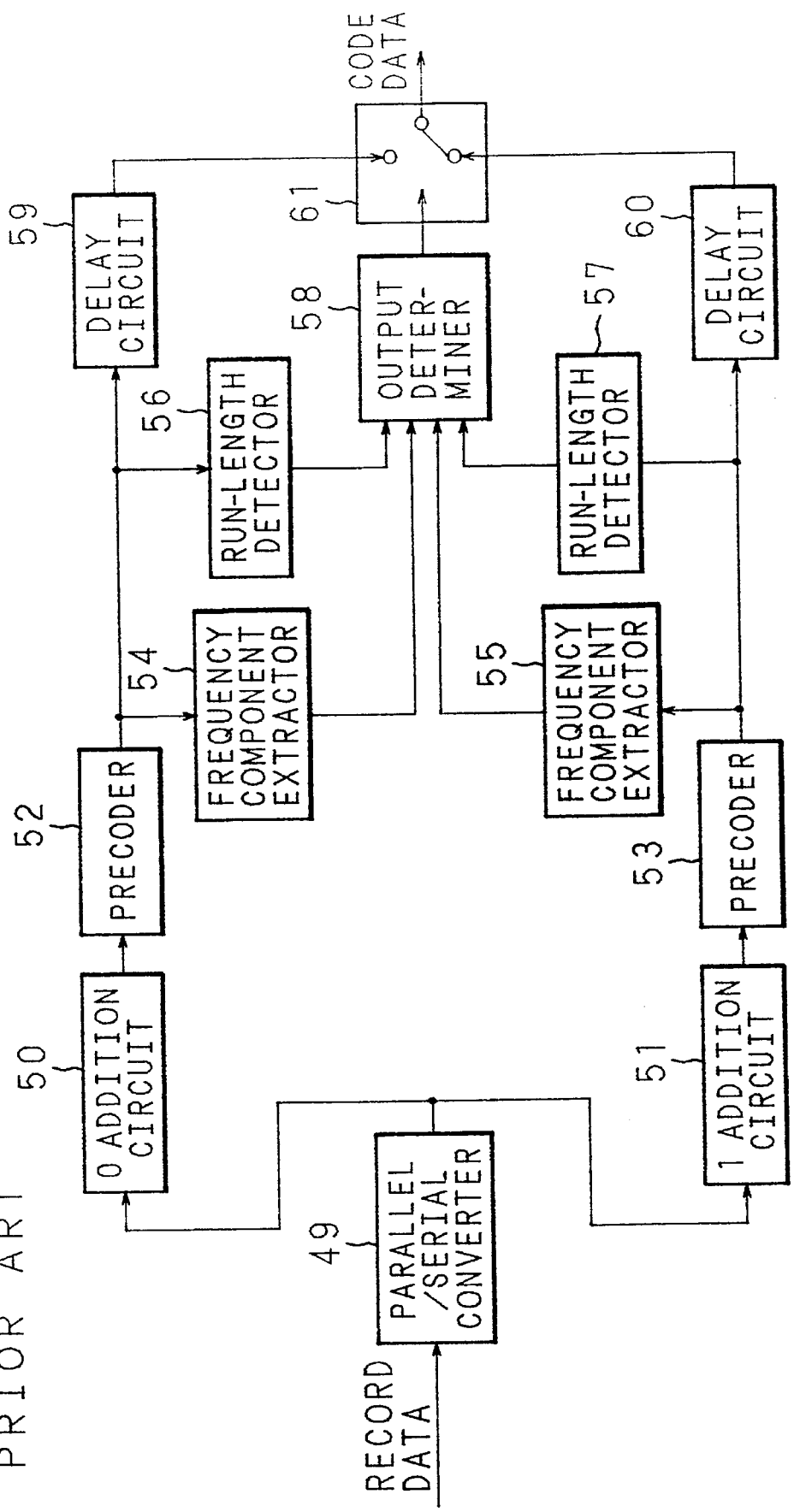
FIG. 3 is a block diagram showing the configuration of an encoding apparatus.
Figure 4:
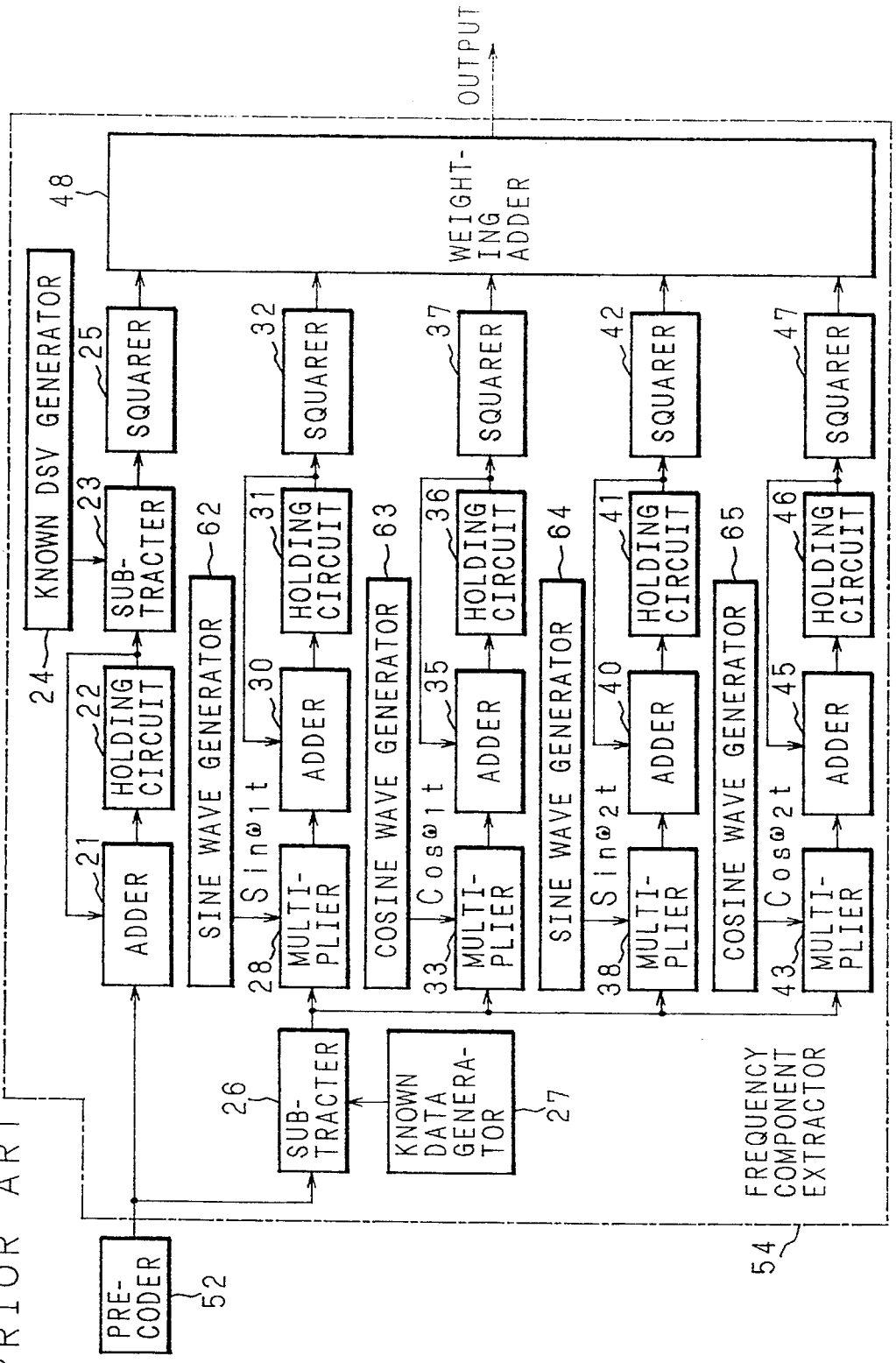
FIG. 4 is a block diagram showing the configuration of a prior art frequency component extractor of the encoding apparatus.
Figure 15:
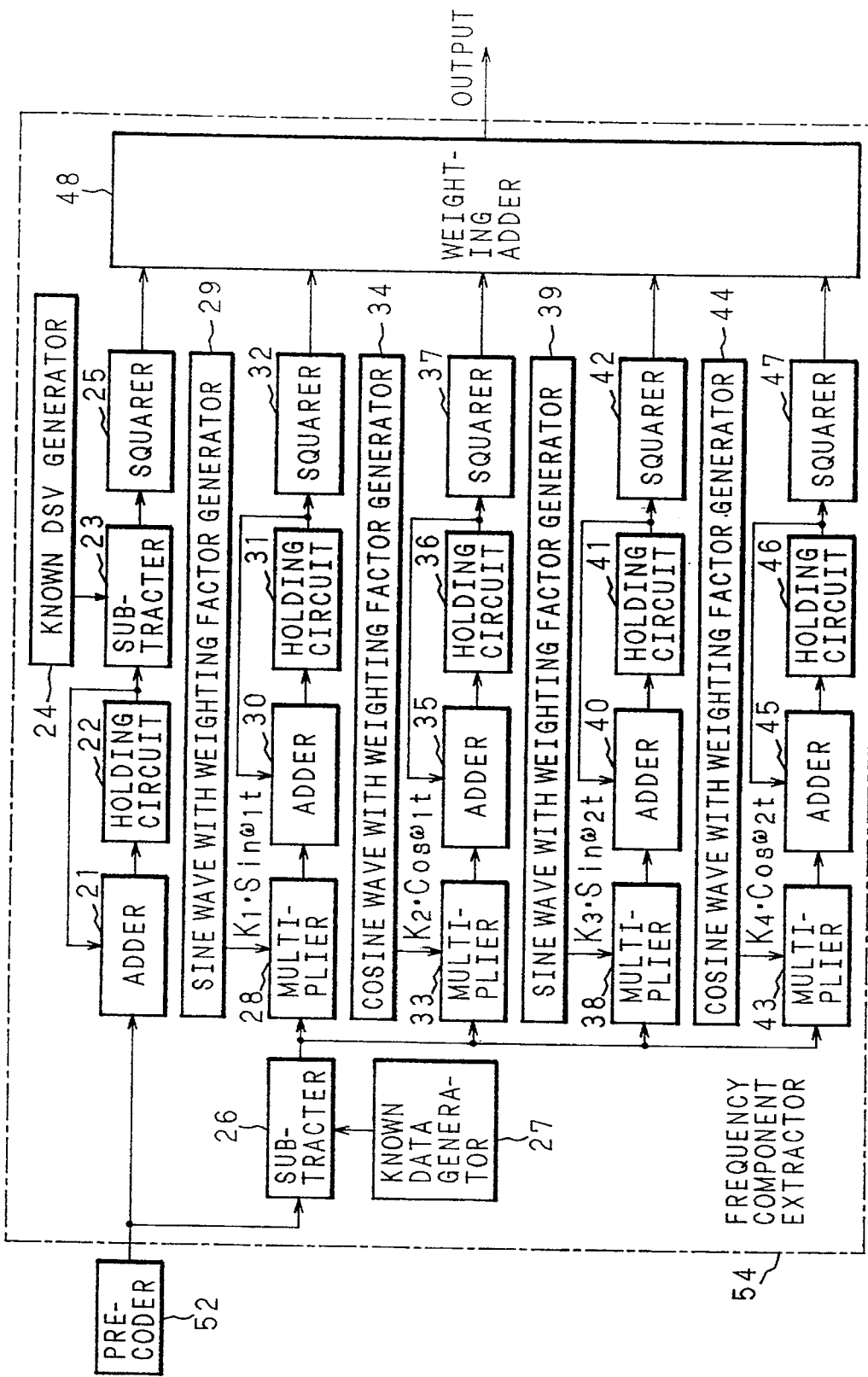
FIG. 15 is a block diagram showing the configuration of a frequency component extractor used in an encoding apparatus of embodiment 5 of the invention.

The encoding apparatus of the invention is configured in the same manner as the prior art example shown in FIG. 3. FIG. 15 is a diagram showing the configuration of a frequency component extractor 54 used in an encoding apparatus of embodiment 5 of the invention. The configuration and operation of a frequency component extractor 55 are the same as those of the frequency component extractor 54, and hence the following description is conducted only on the frequency component extractor 54. The frequency component extractor 54 has adders 21, 30, 35, 40 and 45, holding circuits 22, 31, 36, 41 and 46, subtracters 23 and 26, a known DSV generator 24, squarers 25, 32, 37, 42 and 47, a known data generator 27, multipliers 28, 33, 38 and 43, a weighting adder 48, sine wave with weighting factor generators 29 and 39, and cosine wave with weighting factor generators 34 and 44.

Data from a precoder 52 is inputted to the adder 21 and the subtracter 26. The adder 21 adds the input value and a value held in the holding circuit 22, and the sum is held in the holding circuit 22. The subtracter 23 obtains a difference between the DSV of an input signal which is an output from the holding circuit 22 and a known DSV generated by the known DSV generator 24, and the difference is outputted to the squarer 25. The squarer 25 squares the difference and outputs it to the weighting adder 48.

On the other hand, the subtracter 26 obtains a difference between the input data and a known data generated by the known data generator 27, and outputs the difference to the multipliers 28, 33, 38 and 43. The multiplier 28 multiplies a sine wave of the amplitude K1 and frequency f1 outputted from the sine wave with weighting factor generator 29 by the input data, and outputs the result to the adder 30. The adder 30 adds the input value and a value held in the holding circuit 31, and the sum is held in the holding circuit 31. The squarer 32 squares the value held by the holding circuit 31 and outputs it to the weighting adder 48. Similarly, the multiplier 33 (38, 43) multiplies a cosine wave of the amplitude K2 and frequency f1 (a sine wave of the amplitude K3 and frequency f2, a cosine wave of the amplitude K4 and frequency f2) outputted from the cosine wave with weighting factor generator 34 (the sine wave with weighting factor generator 39, the cosine wave with weighting factor generator 44) by the input data, and outputs the result to the adder 35 (40, 45). The adder 35 (40, 45) adds the input value and a value held in the holding circuit 36 (41, 46), and the sum is held in the holding circuit 36 (41, 46). The squarer 37 (42, 47) squares the value held by the holding circuit 36 (41, 46) and outputs it to the weighting adder 48.

Figure 16:
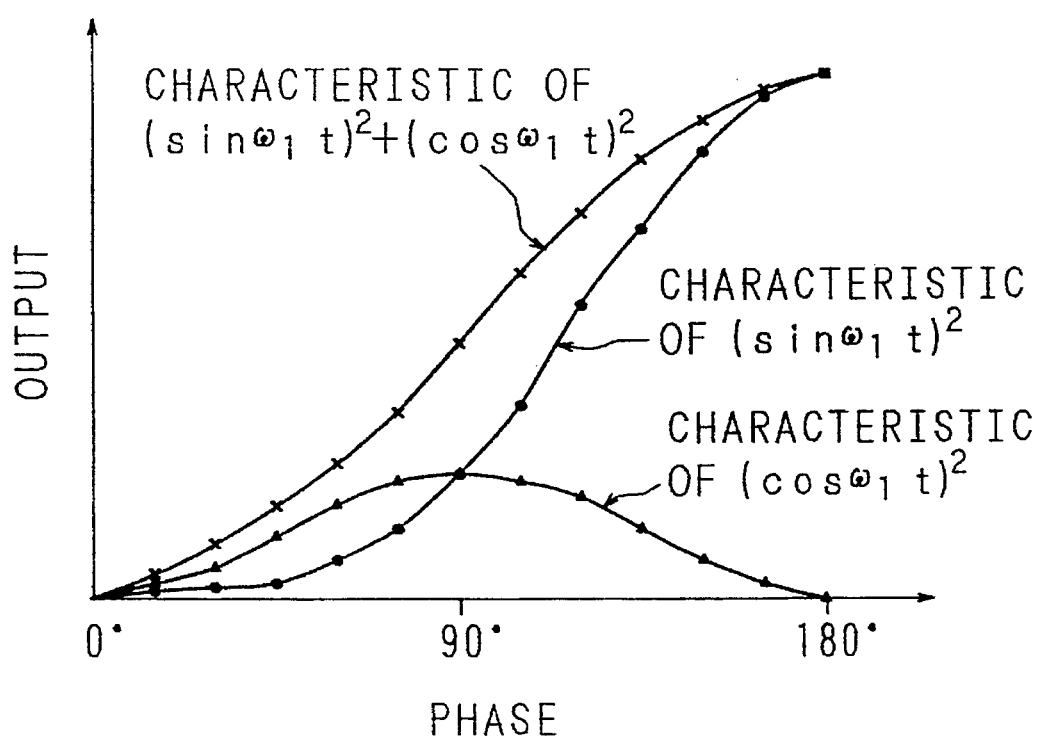
FIG. 16 is a diagram showing phase-output characteristics of a sine term, a cosine term, and a sum of the sine term and the cosine term which is obtained when the ratio of weighting factors of the sine and cosine terms is 1:1.
Figure 17:
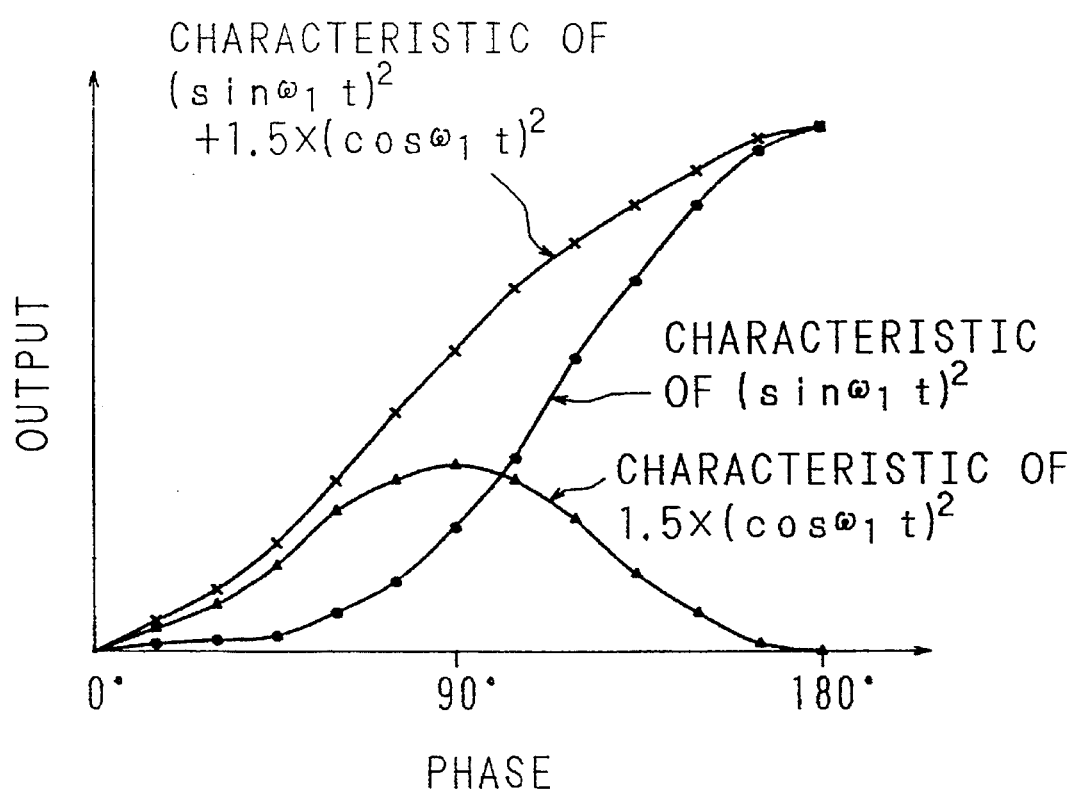
FIG. 17 is a diagram showing phase-output characteristics of a sine term, a cosine term, and a sum of the sine term and the cosine term which is obtained when the ratio of weighting factors of the sine and cosine terms is 1:1.5.
Figure 18:
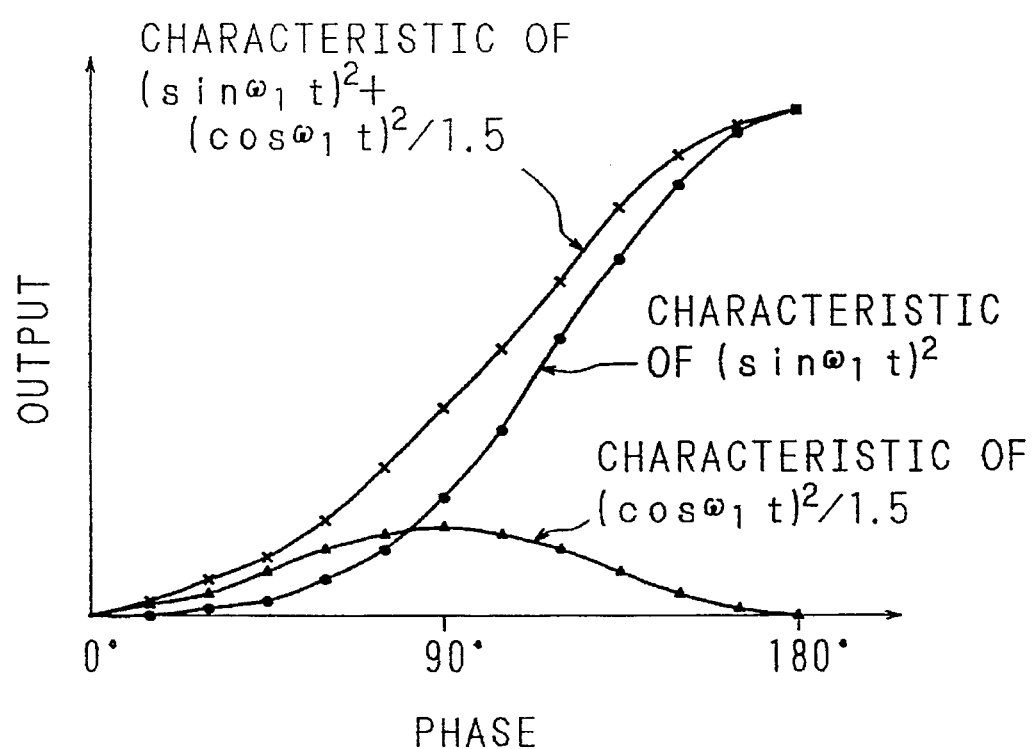
FIG. 18 is a diagram showing phase-output characteristics of a sine term, a cosine term, and a sum of the sine term and the cosine term which is obtained when the ratio of weighting factors of the sine and cosine terms is 1.5:1.

Next, the operation of embodiment 5 will be described. FIGS. 16, 17 and 18 are diagrams showing examples of phase-output characteristics of a squared output of a sine wave multiplication result (hereinafter, the output is referred to as "sine term"), a squared output of a cosine wave multiplication result (hereinafter, the output is referred to as "cosine term"), and a sum of the sine term and the cosine term. FIG. 16 shows the case where the ratio of weighting factors of the sine and cosine terms is 1:1, FIG. 17 the case where the ratio of weighting factors of the sine and cosine terms is 1:1.5, and FIG. 18 the case where the ratio of weighting factors of the sine and cosine terms is 1.5:1.

Figure 19:
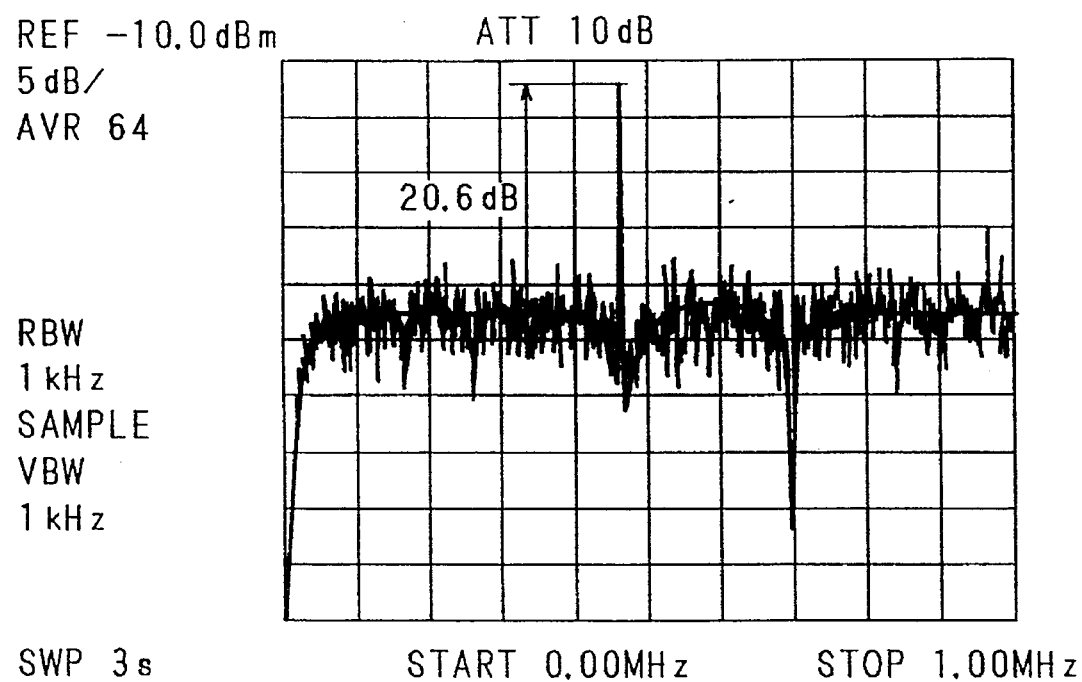
FIG. 19 is a diagram showing a frequency spectrum of code data in the case where the ratio of weighting factors of sine and cosine terms is 1:1.
Figure 20:
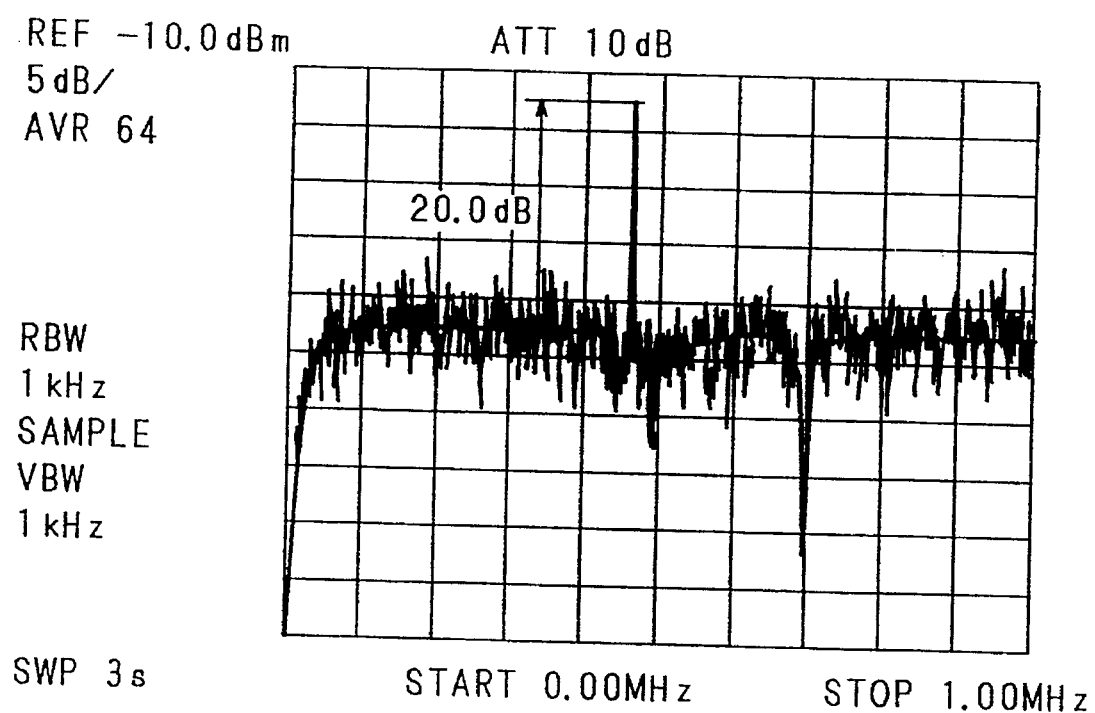
FIG. 20 is a diagram showing a frequency spectrum of code data in the case where the ratio of weighting factors of sine and cosine terms is 1:1.5.
Figure 21:
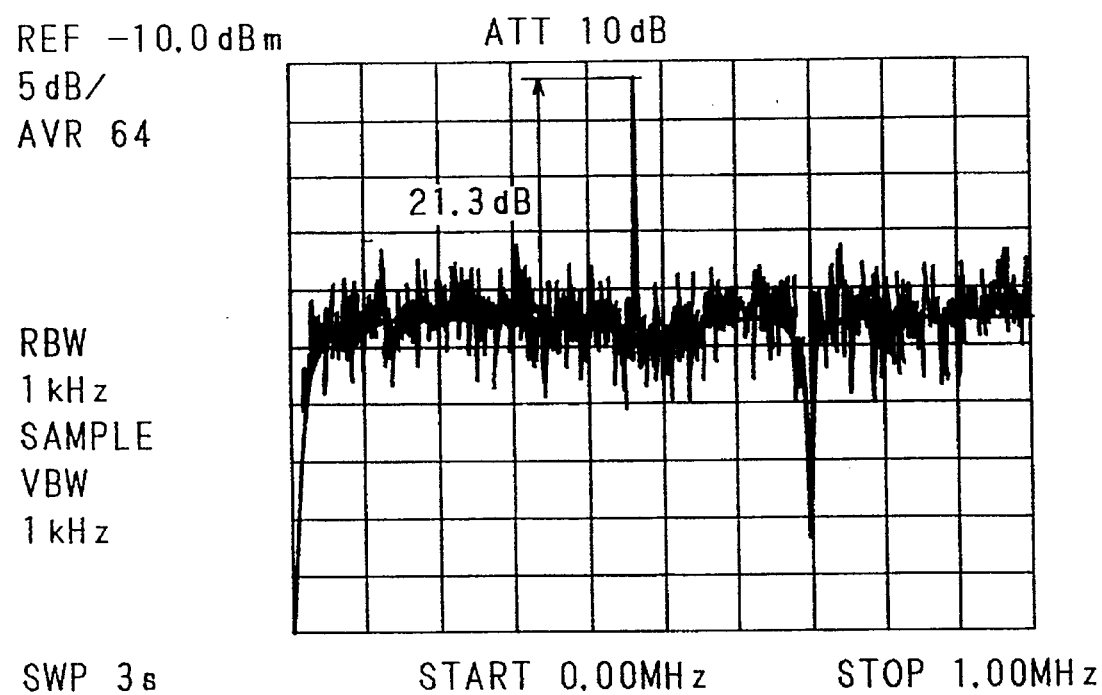
FIG. 21 is a diagram showing a frequency spectrum of code data in the case where the ratio of weighting factors of sine and cosine terms is 1.5:1.

FIGS. 19, 20 and 21 are diagrams showing examples of a frequency spectrum of code data which are encoded by the encoding apparatus of embodiment 5. FIG. 19 shows the case where the ratio of weighting factors of the sine and cosine terms is 1:1, FIG. 20 the case where the ratio of weighting factors of the sine and cosine terms is 1:1.5, and FIG. 21 the case where the ratio of weighting factors of the sine and cosine terms is 1.5:1.

Figure 22:
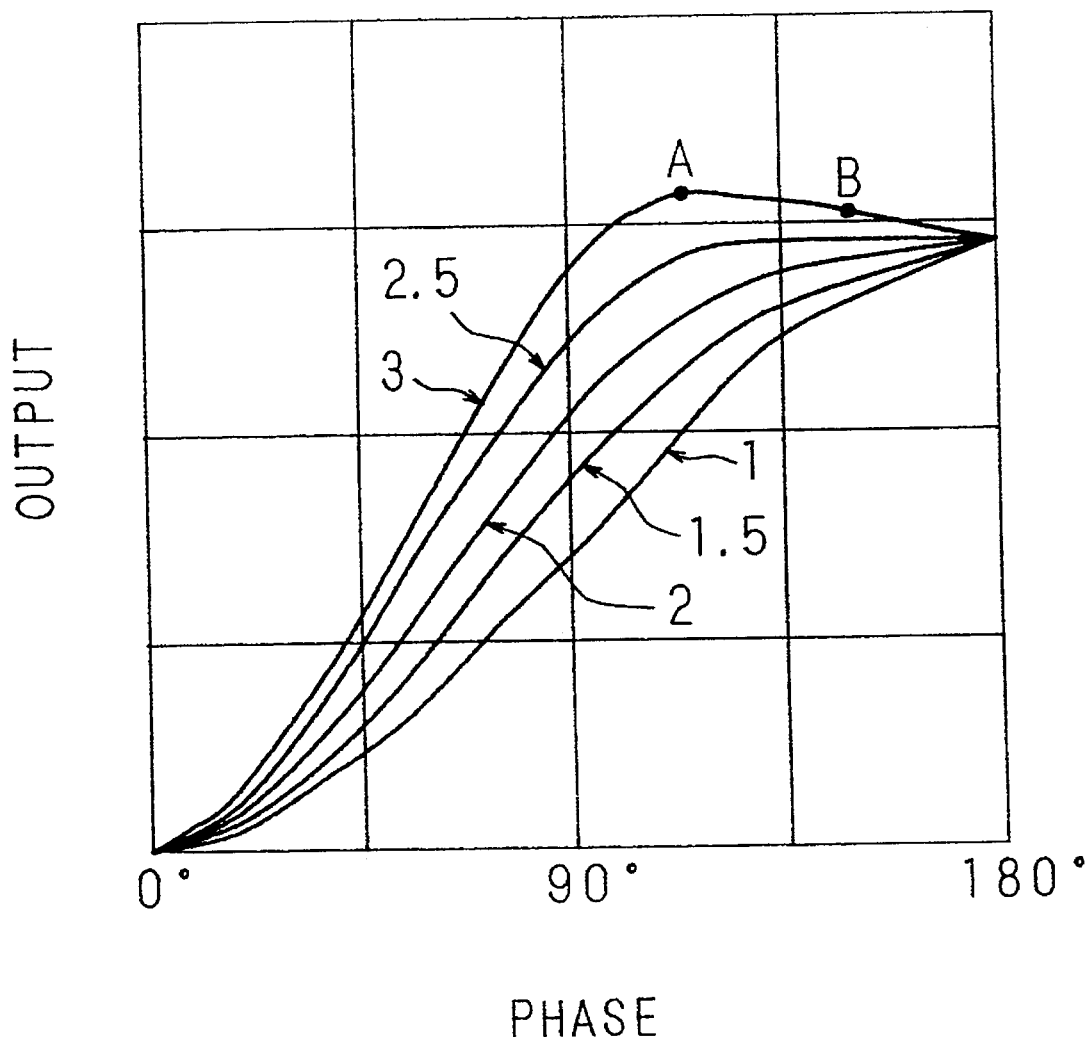
FIG. 22 is a diagram showing phase-output characteristics of a sum of a sine term and a cosine term which is obtained when the weighting factor of the cosine term is greater.
Figure 23:
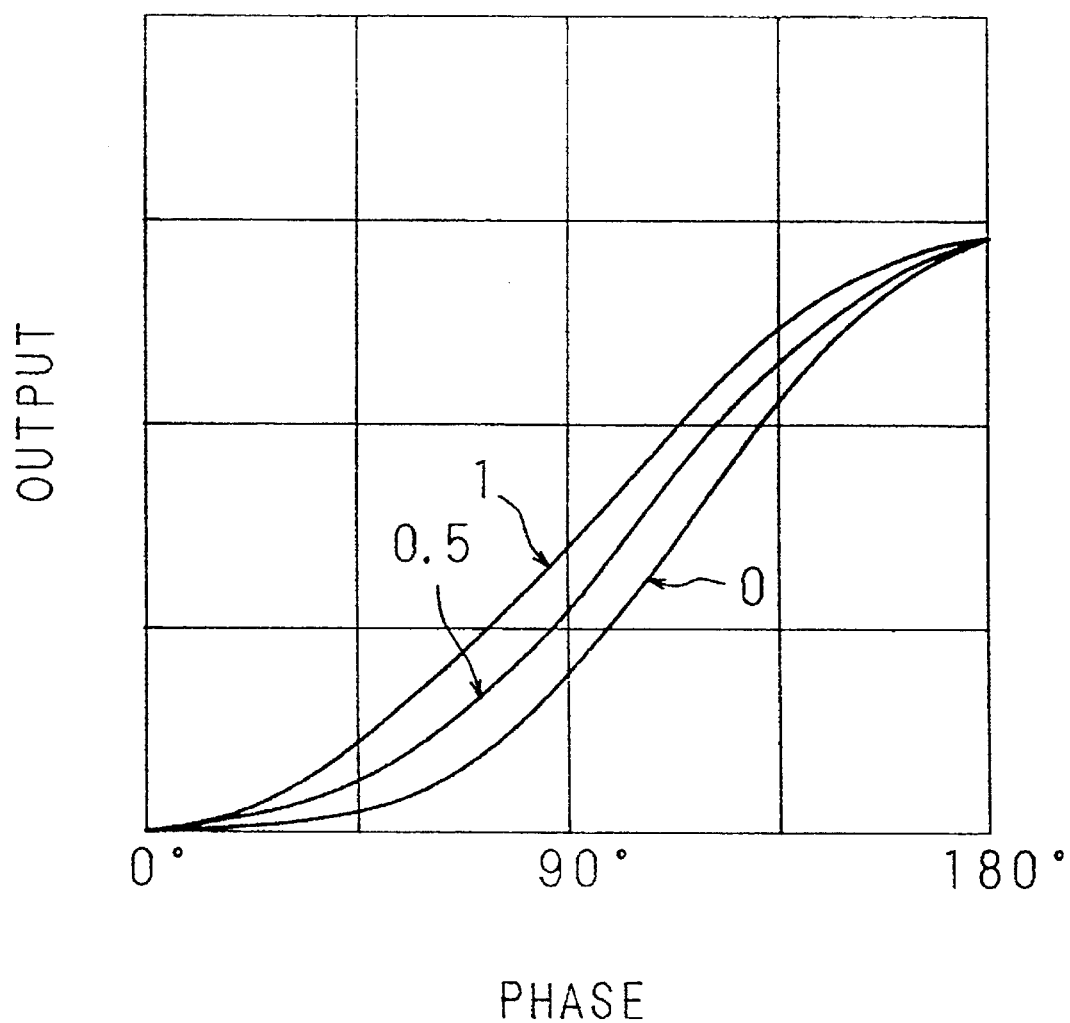
FIG. 23 is a diagram showing phase-output characteristics of a sum of a sine term and a cosine term which is obtained when the weighting factor of the cosine term is smaller.

FIGS. 22 and 23 are diagrams showing phase-output characteristics of a sum of a sine term and a cosine term in the cases where the weighting factors of the sine and cosine terms are changed. FIG. 22 shows the case where the weighting factor of the cosine term is made greater, and FIG. 23 the case where the weighting factor of the cosine term is made smaller.

In embodiment 5, the method of extracting DC and pilot components is the same as that of the prior art example, and therefore its description is omitted. In order to simplify the description, only the method of generating a pilot signal f1 and a notch in the vicinity of the signal with respect to the code data F1 will be described. The same method is conducted also with respect to the code data F2. Embodiment 5 aims to conduct weighting on sine and cosine terms for generating a notch so that characteristics of the frequency spectrum of a record signal are changed. In order to consider the relationship between the weighting of sine and cosine terms and variation of characteristics of the frequency spectrum of a record signal, FIGS. 16, 17 and 18 show phase-output characteristics.

FIG. 16 is a diagram showing characteristics obtained when both the sine and cosine terms are not weighted. The output of the sum of the two terms with respect to the phase difference at the pilot frequencies of the DSV of an input signal and the known DSV increases as the phase difference increases from 0° to 180°. The signal at the phase difference of 0° is the pilot signal itself. In the coding process, therefore, the output of a smaller sum of two terms is selected as the output. This allows all coded signals to tend to approach the phase difference of 0° with respect to the known DSV, and therefore a pilot signal and a notch in the vicinity of the signal are generated. FIG. 19 shows a frequency spectrum of code data obtained in this case.

FIG. 17 shows an example in which the weight of the cosine term is increased to 1.5. In this case, the output of the sum of the two terms has a steep slope in the phase range of 0° to 90° so that the phase pulling-in characteristic is improved, and a gentle slope in the range of 90° to 180° so that the phase pulling-in characteristic is impaired. The level of a pilot signal is lowered when the phase is shifted by 180°. In other words, this shows that, as compared to the case of FIG. 16, the power of generating a notch is larger and that of generating a pilot signal is smaller. FIG. 20 shows a frequency spectrum of code data obtained in this case. As compared to FIG. 19, the notch is widened and the pilot signal is lowered in level by 0.6 dB.

FIG. 18 shows an example in which the weight of the cosine term is reduced to 1/1.5. In this case, the output of the sum of the two terms has a gentle slope in the range of 0° to 90°, and a steep slope in the range of 90° to 180°. As described above, this shows that, as compared to the case of FIG. 16, the power of generating a pilot signal is larger and that of generating a notch is smaller. FIG. 21 shows a frequency spectrum of code data obtained in this case. As compared to FIG. 19, the pilot signal is increased in level by 0.7 dB and the notch is shallowed.

In order to investigate these characteristics in more detail, diagrams of characteristics of weight factors and a sum of the two terms are shown in FIGS. 22 and 23. FIG. 22 shows the variation of the characteristics of the sum of the two terms in the case where the weighting factor of the cosine term is increased. It should be noted that the output characteristics obtained at a weighting factor of 2.5 or more show a mountain-like shape or have a peak in the phase difference range of 0° to 180°. When the outputs of point A in the figure and point B corresponding to a larger phase difference are compared to each other, the output of point B is smaller. In other words, a signal of a largely shifted phase is likely to be selected as a coded signal, and this may greatly reduce the level of a pilot signal. The weighting factors must be decided by paying attention to this fact.

FIG. 23 shows the variation of the characteristics of the sum of the two terms in the case where the weighting factor of the cosine term is reduced. The characteristics obtained when the weight of the cosine term is 0 are those of the sine term themselves. This means that the control of the coding process is nothing but the operation of always causing an input signal to approach the known DSV; no power for controlling pilot frequency components other than those which are in-phase with the pilot signal exists. The frequency spectrum of code data according to this is free from DC components and has a pilot signal, but a notch is not generated in the vicinity of the pilot signal.

Next, the specific operation of extracting a notch component in embodiment 5 will be described in accordance with the operation of the circuits of FIG. 15. In the same manner as the prior art example, the subtraction result obtained by the subtracter 26 is supplied to the multipliers 28 and 33. The sine wave with weighting factor generator 29 generates a sine wave of the weighting factor K1 and frequency f1. The sine wave is multiplied by the subtraction result. Furthermore, the cosine wave with weighting factor generator 34 generates a cosine wave of the weighting factor K2 and frequency f1. The cosine wave is multiplied by the subtraction result. The operation of the adders 30 and 35 and the following parts are the same as those of the prior art example. When the sine wave with weighting factor generator 39, and the cosine wave with weighting factor generator 44 operate so as to form a notch at the pilot frequency f2 and the code data F2 is generated, weighting factors must be given in the same manner as the code data F1. When the code data F1 is to be generated, the weighting factors are not necessary. The apparatus may be so configured that the factors are variable. Even when the factors are given as they are, a notch sufficient, for a practical use can be obtained, and therefore the apparatus may remain unchanged in order to simplify the configuration.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A data conversion apparatus which converts m-bit data into plural n-bit codes having different CDS (Codeword Digital Sum) values, thereby obtaining an intense spectrum at frequencies with a period of p bits, comprising:

means for generating data of a known CDS in codeword with one period which is the least common multiple (q) of n and p;

means for detecting differences between values of charge in codeword at intervals of (r) bits (where r is the greatest common divisor of n and p not equal to n) and the data of the known CDS;

means for detecting a sum of absolute values of an (n/r) number of the differences of each of the n-bit codes; and means for selecting a code from the plural n-bit codes having different CDS values, the selected code having a smallest associated sum of absolute values.

2. A data conversion apparatus which converts m-bit data into plural n-bit codes having different CDS (Codeword Digital Sum) values, thereby obtaining an intense spectrum at frequencies with a period of p bits, comprising:

means for accumulating DSV (Digital Sum Variation) of preceding codes;

means for generating data of a known DSV with one period which is the least common multiple (q) of n and p;

means for adding values of charge in codeword at intervals of (r) bits (where r is the greatest common divisor of n and p) to the DSV of preceding codes;

means for detecting a difference between DSV obtained by the addition and at intervals of r bits and the data of the known DSV;

means for detecting a sum of absolute values of an (n/r) number of the differences of each of the n-bit codes; and means for selecting a code from the plural codes having different CDS values, the code having the smallest sum of absolute values.

3. An encoding apparatus conducts an extraction of sine and cosine components of each of N frequencies on two kinds of (m+1)-bit data strings to which 1 bit of "0" or "1" is added at intervals of m bits, selects from the two kinds of data strings one data string in which frequency components increase or decrease with a greater degree based on at least the extracted sine or cosine components, and outputs the selected data string, comprising:

means for providing at least one of the extracted sine or cosine component with a weighting factor such that weighting of said sine and cosine components differ;

means for selecting from the two kinds of data strings one data string in which frequency components increase or decrease with a greater degree based on a result of the weighted sine an cosine components; and means for outputting the selected data string.

4. An encoding apparatus of claim 3, wherein, when a weighting factor is to be decided, the weighting factor is decided so that, in a sum of the sine and cosine components at least one of which is provided with the weighting factor, an output obtained in the phase difference range of 0° to 180° is not greater than an output obtained at 180° in phase difference-output characteristics of an input signal and a pilot signal.

5. A data conversion apparatus, comprising:

converting means for converting m-bit data into plural n-bit codes having different CDS (Codeword Digital Sum) values;

dividing means for dividing each of the plural n-bit codes into at least two code portions;

charge determining means for simultaneously determining a CDS of each code portion for an n-bit code;

generating means for generating known CDSs corresponding to each of the code portions;

error detecting means for simultaneously detecting differences between the CDS of each code portion for an n-bit code and the corresponding known CDSs to produce CDS difference values;

summing means for summing absolute values of the CDS difference values for an n-bit code to produce a CDS sum; and selecting means for selecting one of the plural n-bit codes having a smallest corresponding CDS sum.

6. The data conversion apparatus of claim 5, wherein the converting means adds two bits to the MSB of the m-bit data to convert the m-bit data in plural n-bit codes.

7. The data conversion apparatus of claim 5, wherein the converting means converts the m-bit data into the plural n-bit codes to obtain an intense spectrum at frequencies with a period of p bits.

8. The data conversion apparatus of claim 5, wherein p is not a multiple of n.

9. The data conversion apparatus of claim 5, wherein the converting means converts the m-bit data into the plural n-bit codes to obtain an intense spectrum at frequencies with a period of p bits; and the dividing means divides each of the plural n-bit codes into r-bit code portions, where r is the greatest common divisor of n and p.

10. The data conversion apparatus of claim 9, wherein r is the greatest common divisor of n and p not equal to n.

11. The data conversion apparatus of claim 5, wherein the generating means generates known CDSs which produce a periodic DSV (Digital Sum Variation).

12. The data conversion apparatus of claim 5, wherein the generating means generates known CDSs which produce a DSV (Digital Sum Variation) having a frequency substantially equal to a desired pilot signal.

13. The data conversion apparatus of claim 5, wherein the converting means divides the m-bit data into at least two data portions, adds at least one bit to a MSB (Most Significant Bit) of each data portion, and concatenates the data portions to convert the m-bit data into plural n-bit codes.

14. A data conversion apparatus, comprising:

converting means for converting m-bit data into plural n-bit codes having different CDS (Codeword Digital Sum) values only by adding at least one bit to a MSB (Most Significant Bit) of the m-bit data;

dividing means for dividing each of the plural n-bit codes into at least two code portions;

charge determining means for determining a CDS of each code portion;

generating means for generating known CDSs corresponding to each of the code portions;

error detecting means for detecting differences between the CDS of each code portion and the corresponding known CDSs to produce CDS difference values;

summing means for summing absolute values of the CDS difference values for an n-bit code to produce a CDS sum; and selecting means for selecting one of the plural n-bit codes having a smallest corresponding CDS sum.

15. The data conversion apparatus of claim 14, wherein the charge determining means determines the CDS of each of the code portions for an n-bit code simultaneously; and the error detecting means detects differences between the CDS of each code portion for an n-bit code and the corresponding known CDSs to produce CDS difference values simultaneously.

16. A data conversion apparatus, comprising:

converting means for converting m-bit data into plural n-bit codes having different CDS (Codeword Digital Sum) values to obtain an intense spectrum at frequencies with a period of p bits where p is not multiple of n;

dividing means for dividing each of the plural n-bit codes into at least two code portions;

charge determining means for determining a CDS of each code portion for an n-bit code;

generating means for generating a known CDSs corresponding to each of the code portions;

error detecting means for detecting differences between the CDS of each code portion for an n-bit code and the corresponding known CDSs to produce CDS difference values;

summing means for summing absolute values of the CDS difference values for an n-bit code to produce a CDS sum; and selecting means for selecting one of the plural n-bit codes having a smallest corresponding CDS sum.

17. A data conversion apparatus, comprising:

converting means for adding a bit to a MSB (Most Significant Bit) of m-bit data to convert the m-bit data into plural (m+1)-bit codes;

accumulating means for accumulating sets of (m+1)-bit codes, each corresponding to different m-bit data;

dividing means for dividing each accumulated set of (m+1)-bit codes into plural code portions;

charge determining means for simultaneously determining a CDS of each code portion for a set of (m+1)-bit codes;

generating means for generating known CDSs corresponding to each of the code portions for a set of (m+1)-bit codes;

error detecting means for simultaneously detecting differences between the CDS of each code portion and the corresponding known CDSs to produce CDS difference values for a set of (m+1)-bit codes;

summing means for summing absolute values of the CDS difference values to produce a CDS sum for a set of (m+1)-bit codes; and selecting means for selecting one set of (m+1)-bit codes having a smallest corresponding CDS sum.

18. The data conversion apparatus of claim 17, wherein the converting means converts the m-bit data into the plural (m+1)-bit codes to obtain an intense spectrum at frequencies with a period of p bits.

19. The data conversion apparatus of claim 18, wherein p is not a multiple of (m+1).

20. The data conversion apparatus of claim 17, wherein the converting means converts the m-bit data into the plural (m+1)-bit codes to obtain an intense spectrum at frequencies with a period of p bits; and the dividing means divides each set of (m+1)-bit codes into r-bit code portions, where r is the greatest common divisor of m+1 and p.

21. The data conversion apparatus of claim 20, wherein r is the greatest common divisor of m+1 and p not equal to m+1.

22. The data conversion apparatus of claim 17, wherein the generating means generates known CDSs which produce a periodic DSV (Digital Sum Variation).

23. The data conversion apparatus of claim 17, wherein the generating means generates known CDSs which produce a DSV (Digital Sum Variation) having a frequency substantially equal to a desired pilot signal.

24. A data conversion apparatus, comprising:

converting means for adding a bit to a MSB (Most Significant Bit) of m-bit data to convert the m-bit data into plural (m+1)-bit codes;

accumulating means for accumulating sets of (m+1)-bit codes, each corresponding to different m-bit data;

dividing means for dividing each accumulated set of (m+1)-bit codes into plural code portions, a number of the code portions being greater than a number of accumulated (m+1)-bit codes forming a set;

charge determining means for determining a CDS of each code portion for a set of (m+1)-bit codes;

generating means for generating known CDSs corresponding to each of the code portions for a set of (m+1)-bit codes;

error detecting means for detecting differences between the CDS of each code portion and the corresponding known CDSs to produce CDS difference values for a set of (m+1)-bit codes;

summing means for summing absolute values of the CDS difference values to produce a CDS sum for a set of (m+1)-bit codes; and selecting means for selecting one set of (m+1)-bit codes having a smallest corresponding CDS sum.

25. The data conversion apparatus of claim 24, wherein the converting means converts the m-bit data into plural (m+1)-bit codes to obtain an intense spectrum at frequencies with a period of p bits.

26. The data conversion apparatus of claim 25, wherein p is not a multiple of m+1.

27. The data conversion apparatus of claim 25, wherein the dividing means divides each accumulated set of (m+1)-bit codes into r-bit code portions, where r is the greatest common divisor of p and m+1 not equal to m+1.

28. A data conversion apparatus, comprising:

converting means for converting m-bit data into plural n-bit codes having different CDS (Codeword Digital Sum) values;

dividing means for dividing each of the plural n-bit codes into at least two code portions;

charge determining means for determining a CDS of each code portion;

charge accumulating means for generating a DSV (Digital Sum Variation) corresponding to each code portion by accumulating CDSs for respective preceding code portions;

generating means for generating known DSVs corresponding to each of the code portions;

error detecting means for detecting differences between the DSV of each code portion and the corresponding known DSVs to produce DSV difference values;

summing means for summing absolute values of the DSV difference values to produce a DSV sum; and selecting means for selecting one of the plural n-bit codes having a smallest corresponding DSV sum.

29. The data conversion apparatus of claim 28, wherein the converting means adds two bits to the MSB of the m-bit data to convert the m-bit data in plural n-bit codes.

30. The data conversion apparatus of claim 28, wherein the converting means converts the m-bit data into the plural n-bit codes to obtain an intense spectrum at frequencies with a period of p bits.

31. The data conversion apparatus of claim 28, wherein p is not a multiple of n.

32. The data conversion apparatus of claim 28, wherein the converting means converts the m-bit data into the plural n-bit codes to obtain an intense spectrum at frequencies with a period of p bits; and the dividing means divides each of the plural n-bit codes into r-bit code portions, where r is the greatest common divisor of n and p.

33. The data conversion apparatus of claim 32, wherein r is the greatest common divisor of n and p not equal to n.

34. The data conversion apparatus of claim 28, wherein the generating means generates the known DSVs so that codes having code portions with the known DSVs would have a periodic DSV.

35. The data conversion apparatus of claim 28, wherein the generating means generates known DSVs so that codes having code portions with the known DSVs would have a DSV with a frequency substantially equal to a desired pilot signal.

36. The data conversion apparatus of claim 28, wherein the charge determining means simultaneously determines the CDSs of each code portion for an n-bit code;

the charge accumulating means simultaneously generates the DSVs corresponding to each code portion; and the error detecting means simultaneously detects differences between the DSV of each code portion for an n-bit code and the corresponding known DSVs to produce the DSV difference values.

37. The data conversion apparatus of claim 28, wherein the converting means divides the m-bit data into at least two data portions, adds at least one bit to a MSB (Most Significant Bit) of each data portion, and concatenates the data portions to convert the m-bit data into plural n-bit codes.

38. A data conversion apparatus, comprising:

converting means for converting m-bit data into plural n-bit codes having different CDS (Codeword Digital Sum) values only by adding at least one bit to a MSB (Most Significant Bit) of the m-bit data;

dividing means for dividing each of the plural n-bit codes into at least two code portions;

charge determining means for determining a CDS of each code portion;

charge accumulating means for generating a DSV (Digital Sum Variation) corresponding to each code portion by accumulating CDSs for respective preceding code portions;

generating means for generating known DSVs corresponding to each of the code portions;

error detecting means for detecting differences between the DSV of each code portion and the corresponding known DSVs to produce DSV difference values;

summing means for summing absolute values of the DSV difference values to produce a DSV sum; and selecting means for selecting one of the plural n-bit codes having a smallest corresponding DSV sum.

39. The data conversion apparatus of claim 38, wherein the charge determining means simultaneously determines the CDS of each code portion for an n-bit code;

the charge accumulating means simultaneously generates the DSV corresponding to each code portion; and the error detecting means simultaneously detects differences between the DSV of each code portion for an n-bit code and the corresponding known DSVs to produce the DSV difference values.

40. A data conversion apparatus, comprising:

converting means for converting m-bit data into plural n-bit codes having different CDS (Codeword Digital Sum) values to obtain an intense spectrum at frequencies with a period of p bits, where p is not a multiple of n;

dividing means for dividing each of the plural n-bit codes into at least two code portions;

charge determining means for determining a CDS of each code portion;

charge accumulating means for generating a DSV (Digital Sum Variation) corresponding to each code portion by accumulating CDSs for respective preceding code portions;

generating means for generating known DSVs corresponding to each of the code portions;

error detecting means for detecting differences between the DSV of each code portion and the corresponding known DSVs to produce DSV difference values;

summing means for summing absolute values of the DSV difference values to produce a DSV sum; and selecting means for selecting one of the plural n-bit codes having a smallest corresponding DSV sum.

41. A data conversion apparatus, comprising:

converting means for adding a bit to a MSB (Most Significant Bit) of m-bit data to convert the m-bit data into plural (m+1)-bit codes;

accumulating means for accumulating sets of (m+1)-bit codes, each corresponding to different m-bit data;

dividing means for dividing each accumulated set of (m+1)-bit codes into plural code portions;

charge determining means for determining a CDS of each code portion for a set of (m+1)-bit codes;

charge accumulating means for generating a DSV (Digital Sum Variation) corresponding to each code portion by accumulating CDSs for respective preceding code portions;

generating means for generating known DSVs corresponding to each of the code portions for a set of (m+1)-bit codes;

error detecting means for detecting differences between the DSV of each code portion and the corresponding known DSVs to produce DSV difference values for a set of (m+1)-bit codes;

summing means for summing absolute values of the DSV difference values to produce a DSV sum for a set of (m+1)-bit codes; and selecting means for selecting one set of (m+1)-bit codes having a smallest corresponding DSV sum.

42. The data conversion apparatus of claim 41, wherein the converting means converts the m-bit data into the plural (m+1)-bit codes to obtain an intense spectrum at frequencies with a period of p bits.

43. The data conversion apparatus of claim 42, wherein p is not a multiple of (m+1).

44. The data conversion apparatus of claim 41, wherein the converting means converts the m-bit data into the plural (m+1)-bit codes to obtain an intense spectrum at frequencies with a period of p bits; and the dividing means divides each set of (m+1)-bit codes into r-bit code portions, where r is the greatest common divisor of m+1 and p.

45. The data conversion apparatus of claim 44, wherein r is the greatest common divisor of m+1 and p not equal to m+1.

46. The data conversion apparatus of claim 41, wherein the generating means generates the known DSVs so that codes having code portions with the known DSVs would have a periodic DSV.

47. The data conversion apparatus of claim 41, wherein the generating means generates known DSVs so that codes having code portions with the known DSVs would have a DSV with a frequency substantially equal to a desired pilot signal.

48. The data conversion apparatus of claim 41, wherein the charge determining means simultaneously determines the CDS of each code portion of an (m+1)-bit code;

the charge accumulating means simultaneously generates the DSV corresponding to each code portion; and the error detecting means simultaneously detects differences between the DSV of each code portion of an (m+1)-bit and the corresponding known DSVs to produce the DSV difference values.

49. A data conversion apparatus, comprising:

converting means for adding a bit to a MSB (Most Significant Bit) of m-bit data to convert the m-bit data into plural (m+1)-bit codes;

accumulating means for accumulating sets of (m+1)-bit codes, each corresponding to different m-bit data;

dividing means for dividing each accumulated set of (m+1)-bit codes into plural code portions, a number of the code portions being greater than a number of accumulated (m+1)-bit codes forming a set;

charge determining means for determining a CDS of each code portion for a set of (m+1)-bit codes;

charge accumulating means for generating a DSV (Digital Sum Variation) corresponding to each code portion by accumulating DSVs for respective preceding code portions;

generating means for generating known DSVs corresponding to each of the code portions for a set of (m+1)-bit codes;

error detecting means for detecting differences between the DSV of each code portion and the corresponding known DSVs to produce DSV difference values for a set of (m+1)-bit codes;

summing means for summing absolute values of the DSV difference values to produce a DSV sum for a set of (m+1)-bit codes; and selecting means for selecting one set of (m+1)-bit codes having a smallest corresponding DSV sum.

50. The data conversion apparatus of claim 49, wherein the converting means converts the m-bit data into plural (m+1)-bit codes to obtain an intense spectrum at frequencies with a period of p bits.

51. The data conversion apparatus of claim 49, wherein p is not a multiple of m+1.

52. The data conversion apparatus of claim 49, wherein the dividing means divides each accumulated set of (m+1)-bit codes into r-bit code portions, where r is the greatest common divisor of p and m+1 not equal to m+1.

53. An encoding apparatus, comprising:

coding data to produce a first and second data string;

extracting means for extracting sine and cosine components from said first and second data strings, said extracted sine and cosine components being weighted differently;

selecting means for selecting, based on said extracted sine and cosine components, one of said first and second data strings in which frequency components increase or decrease with a greater degree; and outputting means for outputting said selected one of said first and second data strings.

* * * * *